(12) United States Patent
Minakawa

(10) Patent No.: US 12,108,249 B2
(45) Date of Patent: Oct. 1, 2024

(54) COMMUNICATION DEVICE, CONTROL METHOD FOR COMMUNICATION DEVICE, AND NON-TRANSITORY COMPUTER-READABLE STORAGE MEDIUM

(71) Applicant: CANON KABUSHIKI KAISHA, Tokyo (JP)

(72) Inventor: Atsushi Minakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 16/743,401

(22) Filed: Jan. 15, 2020

(65) Prior Publication Data
US 2020/0154276 A1 May 14, 2020

Related U.S. Application Data

(63) Continuation of application No. PCT/JP2018/025342, filed on Jul. 4, 2018.

(30) Foreign Application Priority Data

Jul. 28, 2017 (JP) ................................ 2017-146799
Apr. 23, 2018 (JP) ................................ 2018-082463

(51) Int. Cl.
*H04L 29/06* (2006.01)
*H04L 9/32* (2006.01)
(Continued)

(52) U.S. Cl.
CPC ......... *H04W 12/069* (2021.01); *H04L 9/3273* (2013.01); *H04W 12/0431* (2021.01); *H04W 76/10* (2018.02); *H04W 84/12* (2013.01)

(58) Field of Classification Search
None
See application file for complete search history.

(56) References Cited

U.S. PATENT DOCUMENTS

| 7,380,118 B2 | 5/2008 | Kuwano et al. ............... 713/155 |
| 8,249,504 B2 | 8/2012 | Fujii ........................... 455/41.2 |

(Continued)

FOREIGN PATENT DOCUMENTS

| CN | 1653778 | 8/2005 |
| CN | 1777133 | 5/2006 |

(Continued)

OTHER PUBLICATIONS

Chang, Pei Shan et al. Secure intra-device communication protocol between applications on a smart device. 2016 14th Annual Conference on Privacy, Security and Trust (PST). https://ieeexplore.ieee.org/stamp/stamp.jsp?tp=&arnumber=7906951 (Year: 2016).*

(Continued)

*Primary Examiner* — Jeremiah L Avery
(74) *Attorney, Agent, or Firm* — Venable LLP

(57) ABSTRACT

A communication device that communicates with an external device performs authentication by exchanging information for authentication processing with the external device. In a case where the communication device detects a request to share unique information that is used to provide a communication parameter during the authentication processing, the communication device shares the unique information with the external device after authentication has been successfully completed.

19 Claims, 18 Drawing Sheets

(51) Int. Cl.
*H04W 12/0431* (2021.01)
*H04W 12/069* (2021.01)
*H04W 76/10* (2018.01)
*H04W 84/12* (2009.01)

(56) References Cited

U.S. PATENT DOCUMENTS

| | | | |
|---|---|---|---|
| 8,832,777 B2* | 9/2014 | Raleigh | H04L 12/1403 |
| | | | 455/406 |
| 2016/0149901 A1* | 5/2016 | Liu | H04W 12/50 |
| | | | 726/5 |
| 2016/0364553 A1* | 12/2016 | Smith | H04L 63/0435 |
| 2017/0026835 A1 | 1/2017 | Hamachi | H04W 12/06 |
| 2017/0078922 A1* | 3/2017 | Raleigh | H04L 69/18 |
| 2017/0215069 A1 | 7/2017 | Nakajima | H04W 12/06 |
| 2017/0295448 A1* | 10/2017 | McCann | H04W 12/04 |
| 2018/0054736 A1 | 2/2018 | Hamachi | H04W 12/06 |
| 2018/0109381 A1* | 4/2018 | Cammarota | H04W 12/041 |
| 2018/0109418 A1* | 4/2018 | Cammarota | H04W 12/50 |
| 2018/0212936 A1 | 7/2018 | Tereo | H04L 63/0442 |
| 2018/0278625 A1* | 9/2018 | Cammarota | H04L 9/3268 |
| 2023/0379705 A1* | 11/2023 | Jung | H04L 41/0806 |
| 2023/0401418 A1* | 12/2023 | Cella | H04L 1/1854 |

FOREIGN PATENT DOCUMENTS

| | | |
|---|---|---|
| JP | 2017-028455 | 2/2017 |
| JP | 2017-028457 | 2/2017 |
| WO | 2017/013852 | 1/2017 |

OTHER PUBLICATIONS

Vijayakumar, Pandi et al. Dual Authentication and Key Management Techniques for Secure Data Transmission in Vehicular Ad Hoc Networks. IEEE Transactions on Intelligent Transportation Systems, vol. 17, Issue: 4. https://ieeexplore.ieee.org/stamp/stamp.jsp?tp=&arnumber=7327222 (Year: 2016).*

He, Daojing et al. Privacy-Preserving Universal Authentication Protocol for Wireless Communications. IEEE Transactions on Wireless Communications, vol. 10, Issue: 2. https://ieeexplore.ieee.org/stamp/stamp.jsp?tp=&arnumber=5668482 (Year: 2011).*

Office Action dated Mar. 8, 2022 in counterpart Chinese Application No. 201880049650.1, together with English translation thereof.

Extended European Search Report dated Feb. 18, 2021 in counterpart EP Application No. 18837789.9.

Wi-Fi Alliance, Wi-Fi Device Provisioning Protocol (DPP) Draft Technical Specification v0.0.35, Nov. 3, 2016.

International Search Report and Written Opinion dated Sep. 11, 2018 for counterpart PCT/JP2018/025342, with English translation of ISR.

* cited by examiner

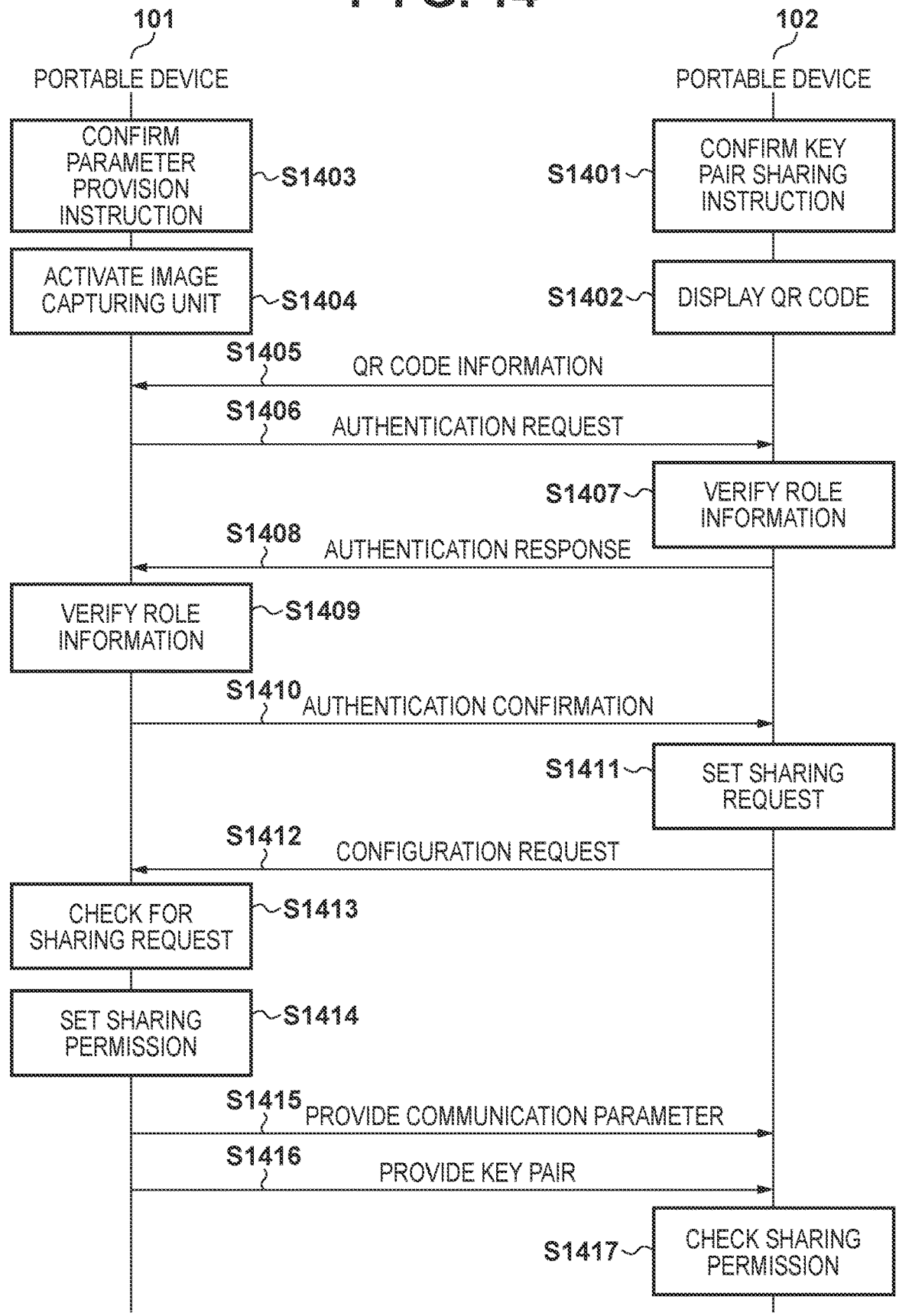

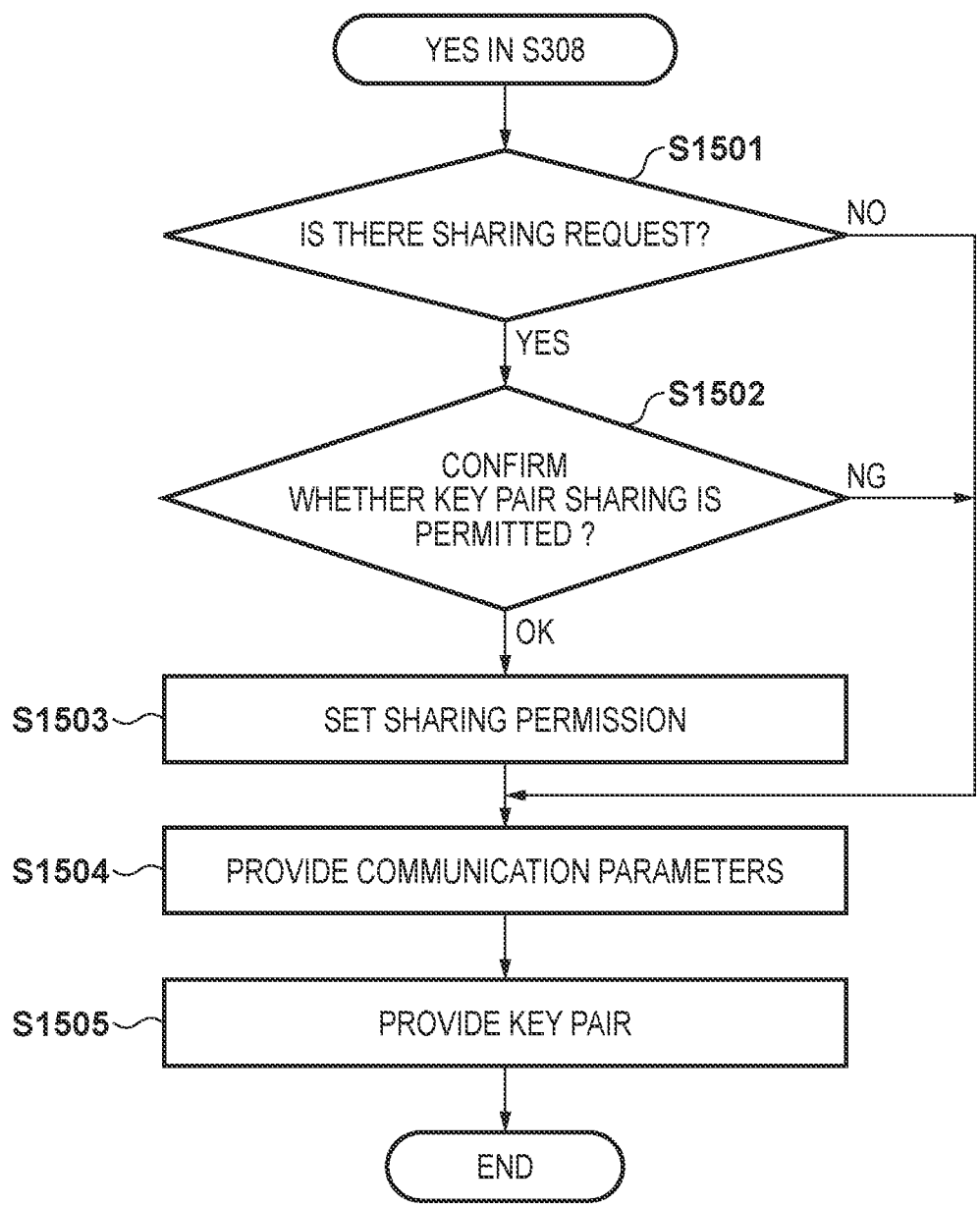

COMMUNICATION DEVICE, CONTROL METHOD FOR COMMUNICATION DEVICE, AND NON-TRANSITORY COMPUTER-READABLE STORAGE MEDIUM

CROSS-REFERENCE TO RELATED APPLICATIONS

This application is a Continuation of International Patent Application No. PCT/JP2018/025342, filed Jul. 4, 2018, which claims the benefit of Japanese Patent Application No. 2017-146799, filed Jul. 28, 2017 and Japanese Patent Application No. 2018-082463, filed Apr. 23, 2018, all of which are hereby incorporated by reference herein in their entirety.

BACKGROUND OF THE INVENTION

Field of the Invention

The present invention relates to a communication device, a control method for a communication device, and a non-transitory computer-readable storage medium.

Background Art

In recent years, it is becoming increasingly common that electronic devices that are equipped with a wireless communication function, such as digital cameras, printers, portable devices, and smartphones, are connected to a wireless network. In order to connect an electronic device to a wireless network, it is necessary to set various communication parameters, such as a cryptosystem, an encryption key, an authentication scheme, and an authentication key. A protocol (Wi-Fi Device Provisioning Protocol, hereinafter referred to as "DPP") for setting communication parameters using a QR code (registered trademark) or the like has been designed as a technology for facilitating the setting of such communication parameters (Non-Patent Literature 1).

According to DPP in Non-Patent Literature 1, a configurator sets communication parameters for forming a wireless network, to an access point, using a private-public key pair. According to Non-Patent Literature 1, communication parameters that are used to connect to an access point are provided to enrollees as well, using the configurator's private-public key pair that has been used to set the access point. Here, in a case in which a large number of enrollees are to be connected to an access point, if there are a plurality of configurators that can provide communication parameters that are used to connect to the access point, efficiency in the distribution of the communication parameters is higher, and accordingly user convenience is improved.

CITATION LIST

Non-Patent Literature

NPTL 1: Wi-Fi Alliance, Wi-Fi Device Provisioning Protocol (DPP) DRAFT Technical Specification v0.0.35

A private-public key pair that is to be used by a configurator to encrypt and decrypt communication parameters that are to be provided to an enrollee is unique to each network. This is because an access point accepts connection thereto only when the communication parameters included in a connection request transmitted from a wireless terminal have been successfully decrypted using the configurator's public key provided at the time of network setting. Thus, only enrollees that hold the communication parameters provided using the configurator's private-public key pair that has been used for setting an access point can connect to the access point. Therefore, in order for a device to provide communication parameters that are used to connect to an access point that has been set by another configurator, the device needs to acquire the configurator's private-public key pair that has been used to set the access point.

Non-Patent Literature 1 discloses that an external storage medium (such as a USB memory or a wireless storage) is used to share the configurator's private-public key pair among a plurality of electronic devices. However, with this method, it is necessary to take troublesome steps through which the configurator's private and public keys, which are pieces of unique information that are used to set communication parameters, are first stored in an external storage medium, and are thereafter read out at another electronic device.

One embodiment of the present invention provides a communication device, a communication method for the same, and a program that can simplify the troublesome steps that are to be taken to provide unique information that has been used to set communication parameters, to another device.

SUMMARY OF THE INVENTION

A communication device according to one aspect of the present invention is a communication device that communicate with an external device, and includes: authentication unit for performing authentication processing by exchanging information for authentication with the external device; detection unit for detecting a request to share unique information that is used to provide a communication parameter during the authentication processing performed by the authentication unit; and sharing unit for sharing the unique information with the external device after authentication has been successfully completed by the authentication unit upon the request being detected by the detection unit.

Further features of the present invention will become apparent from the following description of exemplary embodiments with reference to the attached drawings. Note that the same reference numerals denote the same or like components throughout the accompanying drawings.

BRIEF DESCRIPTION OF THE DRAWINGS

FIG. 14 is a sequence diagram showing key pair sharing processing according to a third embodiment.

FIG. 15 is a flowchart showing operations performed by the portable device 101 according to the third embodiment.

DESCRIPTION OF THE EMBODIMENTS

The following describes embodiments according to the present invention with reference to the accompanying drawings. Note that the technical scope of the present invention is defined by claims, and is not limited by the following individual embodiments.

First Embodiment

Figure 1:
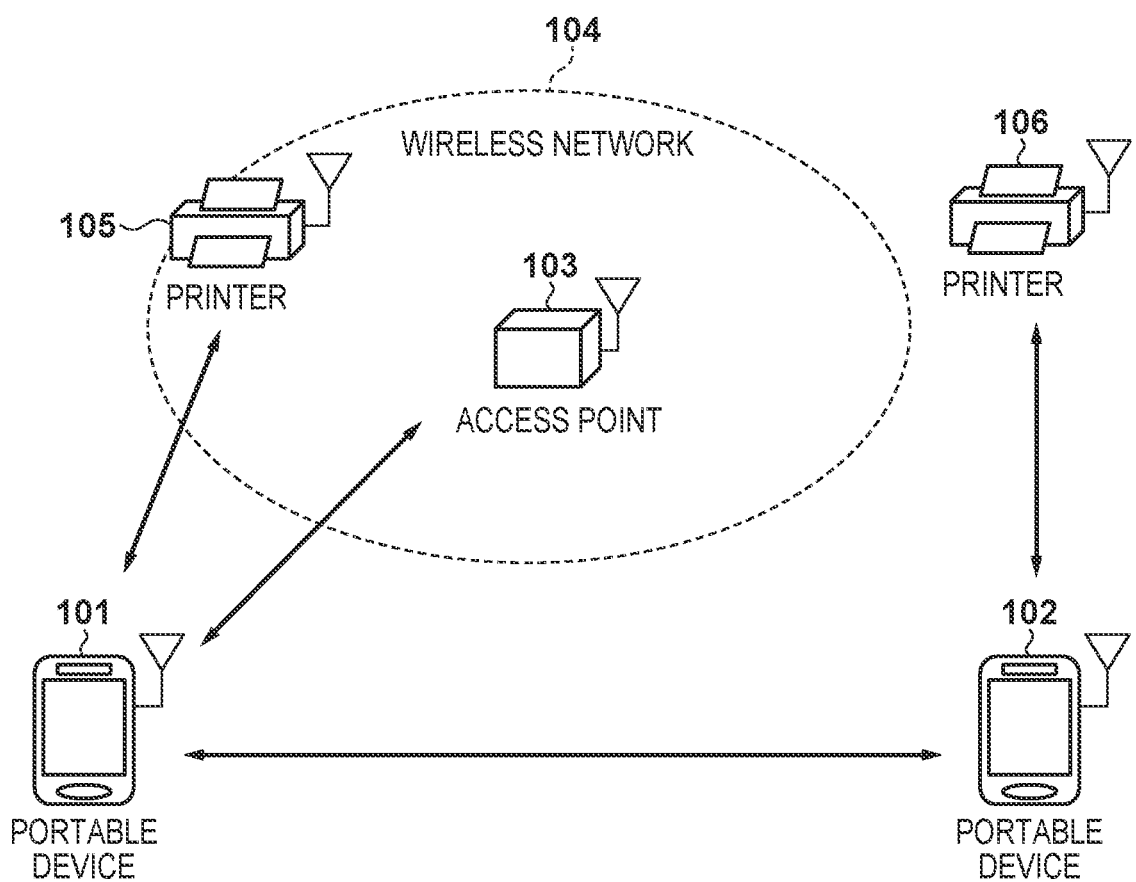
FIG. 1 is a diagram showing an example of a configuration of a communication system according to an embodiment.

FIG. 1 shows an example of a configuration of a communication system according to a first embodiment.

A portable device 101 has a wireless LAN function, and operates as a configurator that is defined in DPP, for example. The portable device 101 can provide an access point 103 with communication parameters that are used to form a wireless network 104. Here, the communication parameters include setting items that are required to perform wireless communication, such as an SSID (Service Set Identifier), which serves as a network identifier, a cryptosystem, an encryption key, and an authentication scheme. Note that the communication parameters provided by the portable device 101, which serves as a configurator, are to be encrypted using a configurator-specific private key that is held by the portable device 101. The portable device 101 can pass a configurator-specific private-public key pair (hereinafter referred to as a key pair), which has been used to set the access point 103, to a portable device 102.

The portable device 102 has a wireless LAN function, and operates as a configurator or an enrollee that are defined in DPP, for example. The portable device 102 can operate as an enrollee to acquire a configurator-specific key pair from the portable device 101, and operate as a configurator that provides communication parameters that are used to connect to the wireless network 104.

The access point 103 operates as an access point that is defined in DPP, for example. The access point 103 can also operate as an enrollee, and form the wireless network 104 by receiving communication parameters from the portable device 101, which serves as a configurator. A printer 105 and a printer 106 have a wireless LAN function and each operate as an enrollee that is defined in DPP, for example. The printer 105 and the printer 106 can connect to the wireless network 104 by acquiring encrypted communication parameters from the portable device 101 or the portable device 102, which serves as a configurator, and decrypting and using the communication parameters.

Note that examples of the portable devices according to the present embodiment include, but are not limited to, electronic devices such as mobile telephones, digital cameras, video cameras, PCs, PDAs, smart phones, smartwatches, and so on. Also, although the present embodiment describes a case in which portable devices and printers are used as electronic devices that are to be connected to a wireless network, the present invention is not limited to such a case, and any electronic devices that can connect to a wireless network, which are not necessarily portable, may be used. In addition, the access point in the present embodiment may be an electronic device that operates as an access point that is defined in DPP and also has a specific function (such as a printer or a digital camera).

Figure 2:
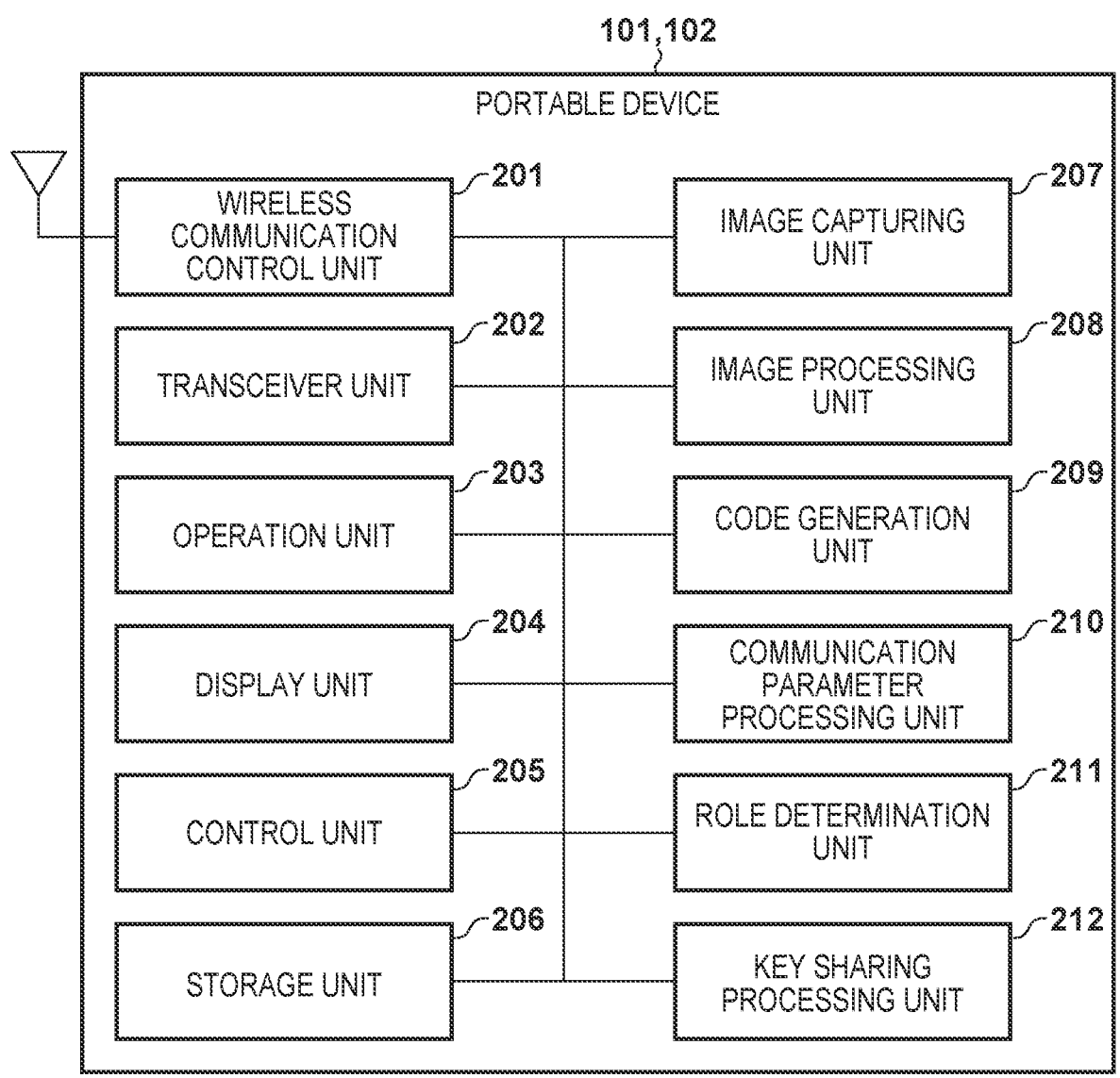
FIG. 2 is a block diagram showing an example of a configuration of a portable device according to an embodiment.

FIG. 2 is a block diagram showing an example of a functional configuration of the portable device 101 and the portable device 102 according to the present embodiment. Each of the functional units shown in FIG. 2 is realized by a computer (a processor) executing a program that is stored in a memory. However, one or more or all of the functions may be realized by dedicated hardware.

In FIG. 2, a wireless communication control unit 201 controls communication that is performed using an antenna, a circuit, and so on to transmit and receive a wireless signal to and from another wireless device via a wireless LAN. A transceiver unit 202 performs data transmission/reception control according to a protocol for each communication layer. An operation unit 203 is used by a user to operate the portable device 101. The operation unit 203 includes a button or the like that is used to activate an image capturing unit 207. Note that the operation unit 203 may be constituted by hardware, or a UI that is provided by software using a display unit 204. The display unit 204 performs various kinds of display processing such as outputting information that can be visually or auditorily recognized, like an LCD, an LED, or a speaker.

The control unit 205 controls the entirety of the portable device 101. A storage unit 206 includes a ROM that stores a program for controlling the portable device 101, and data, and a RAM that serves as a temporary storage. The operations described below are achieved by a CPU (not shown) executing a control program that is stored in the storage unit 206 and realizing functional units such as the control unit 205.

The image capturing unit 207 includes an imaging device, a lens and so on, and captures a still image and a moving image. An image processing unit 208 performs image processing on an image captured by the image capturing unit 207, for example. The image processing unit 208 also analyzes a QR code image captured by the image capturing unit 207, and decrypts information that has been encoded, to acquire the information (QR code information). A code generation unit 209 generates QR code information, and performs control to display the generated QR code information on the display unit 204 as a QR code (image). Although a QR code is used as an image that shows code information in the present embodiment, such an image is not limited to a QR code, and may be a barcode, two-dimensional code, or the like.

A communication parameter processing unit 210 performs processing to provide and acquire communication parameters that are used to connect to the wireless network 104. A role determination unit 211 determines the role of a partner device to/from which communication parameters are transmitted/received. In the present embodiment, types of roles that are to be determined include, but are not limited to, a "configurator" that provides communication parameters, an "enrollee" that acquires communication parameters, and so on. For example, there may be the role of providing a configurator-specific key pair, the role of acquiring a configurator specific key pair, and so on.

A key sharing processing unit 212 performs processing to share a private-public key pair (a key pair) that has been used to provide communication parameters to the access point 103, with another device. The key sharing processing unit 212 performs key sharing processing upon receiving an instruction to perform key sharing from a user and permission from a partner device given in response to a share request.

Note that the above-described functional blocks are examples. Some of the functional blocks may constitute one functional block, and any of the functional blocks may be further divided into blocks that perform a plurality of functions.

Next, processing that is performed to provide communication parameters that are defined in the DPP standards will be described with reference to FIGS. 3 and 4. Also, processing that is performed to connect to an access point that is defined in the DPP standards will be described with reference to FIG. 5.

First, the following describes processing that is performed by the portable device 101, which serves as a configurator, to provide communication parameters in order to enable the access point 103 to form the wireless network 104, and enable the printer 105 to connect to the wireless network 104. FIG. 3 is a flowchart showing processing through which the portable device 101, which serves as a configurator, provides communication parameters to the access point 103, which serves as an enrollee.

In the portable device 101, upon receiving an instruction to provide parameters, from a user, the control unit 205 activates the image capturing unit 207 in order to capture an image of a QR code displayed by the access point 103 (S301). Thereafter, the control unit 205 determines whether or not the image capturing unit 207 of the portable device 101 has captured the image of the QR code (S302). Here, a QR code that is displayed by the access point 103 is not limited to being displayed on a display or the like, and may be printed on a label or the like attached to the housing or an accessory of an electronic device. Also, a QR code may be written on a manual, for example. In S302, if an image of the QR code has not been successfully captured within a predetermined period from the activation of the image capturing unit 207, communication parameter providing processing may be terminated.

If it is determined that an image of the QR code has been captured (YES in S302), the image processing unit 208 decodes the QR code in the captured image to acquire QR code information that includes a public key for authentication of the access point 103 (S303). Next, the control unit 205 transmits an authentication request to the access point 103, using the transceiver unit 202 and the wireless communication control unit 201 (S304). This authentication request is a DPP Authentication Request frame defined in the DPP standards, for example. This authentication request includes authentication information that is used for authentication, identification information of the portable device 101, role information, a random number, and a public key for shared key generation.

Authentication information is the hash value of a public key for authentication of the access point 103, which is included in the QR code. Identification information is the hash value of a public key for authentication of the portable device 101. Role information indicates the role of the portable device 101 (a configurator or an enrollee, for example). The random number is used for authentication when an authentication response described below is received. The public key for shared key generation is a key from which a shared key is generated with involvement of the access point 103.

The access point 103 that has received the authentication request determines whether or not the device that has transmitted the authentication request is the device that has captured the image of the QR code. This determination is performed using authentication information that is included in the authentication request. That is to say, the access point 103 calculates the hash value of the public key included in the displayed QR code, compares the calculated hash value with the hash value (authentication information) included in the authentication request, and determines that verification is successful if the hash values are the same. Here, the access point 103 and the portable device 101 that transmits an authentication request have made an agreement in advance regarding the hash function that is used to calculate the hash value.

The public key included in the authentication request is the key from which a shared key is generated. A shared key is used to encrypt and decrypt information that is transmitted to and received from the access point 103, such as tag information described below. The portable device 101, which serves as a configurator, generates a shared key, using both the public key for shared key generation of the access point 103 (which is included in an authentication response described below) and the private key for shared key generation of the portable device 101. On the other hand, the access point 103, which serves as an enrollee, generates a shared key, using both the public key for shared key generation of the portable device 101 and the private key for shared key generation of the access point 103. The shared key is generated based on the ECDH (Elliptic Curve Diffie-Hellman) scheme, for example. In the following description, the scheme based on which the shared key is generated is assumed to be the ECDH scheme, but is not limited to this scheme. Another public key cryptosystem may be used to generate the shared key.

In S304, after transmitting the authentication request to the access point 103, the control unit 205 of the portable device 101 waits for an authentication response from the access point 103 (S305). In S304, if the control unit 205 cannot receive the authentication response within a predetermined period, the control unit 205 terminates communication parameter providing processing.

The authentication response is a DPP Authentication Response frame defined in the DPP standards, for example. This authentication response includes the public key for shared key generation of the access point 103, role information, a random number, and tag information. The portable device 101 generates a shared key using the public key for shared key generation of the access point 103 and the private key for shared key generation of the portable device 101. The generation of the shared key is as described above.

Tag information is a random number that is included in the authentication request transmitted by the portable device 101, and has been encrypted using the shared key generated using both the private key for shared key generation of the access point 103 and the public key for shared key generation of the portable device 101. The portable device 101 determines that authentication is successful if the tag information can be properly decrypted using the shared key generated by the portable device 101 itself. More specifically, the control unit 205 generates a shared key, using the private key for shared key generation of the portable device 101 and the public key for shared key generation of the access point 103, through a method that is the same as the method in which the access point 103 generated the shared key, and verifies the tag information, using the shared key. The control unit 205 determines that authentication is successful if the control unit 205 can decrypt tag information using the shared key generated by the control unit 205 itself, and determines that the authentication has failed if the control unit 205 cannot decrypt tag information.

Figure 3:
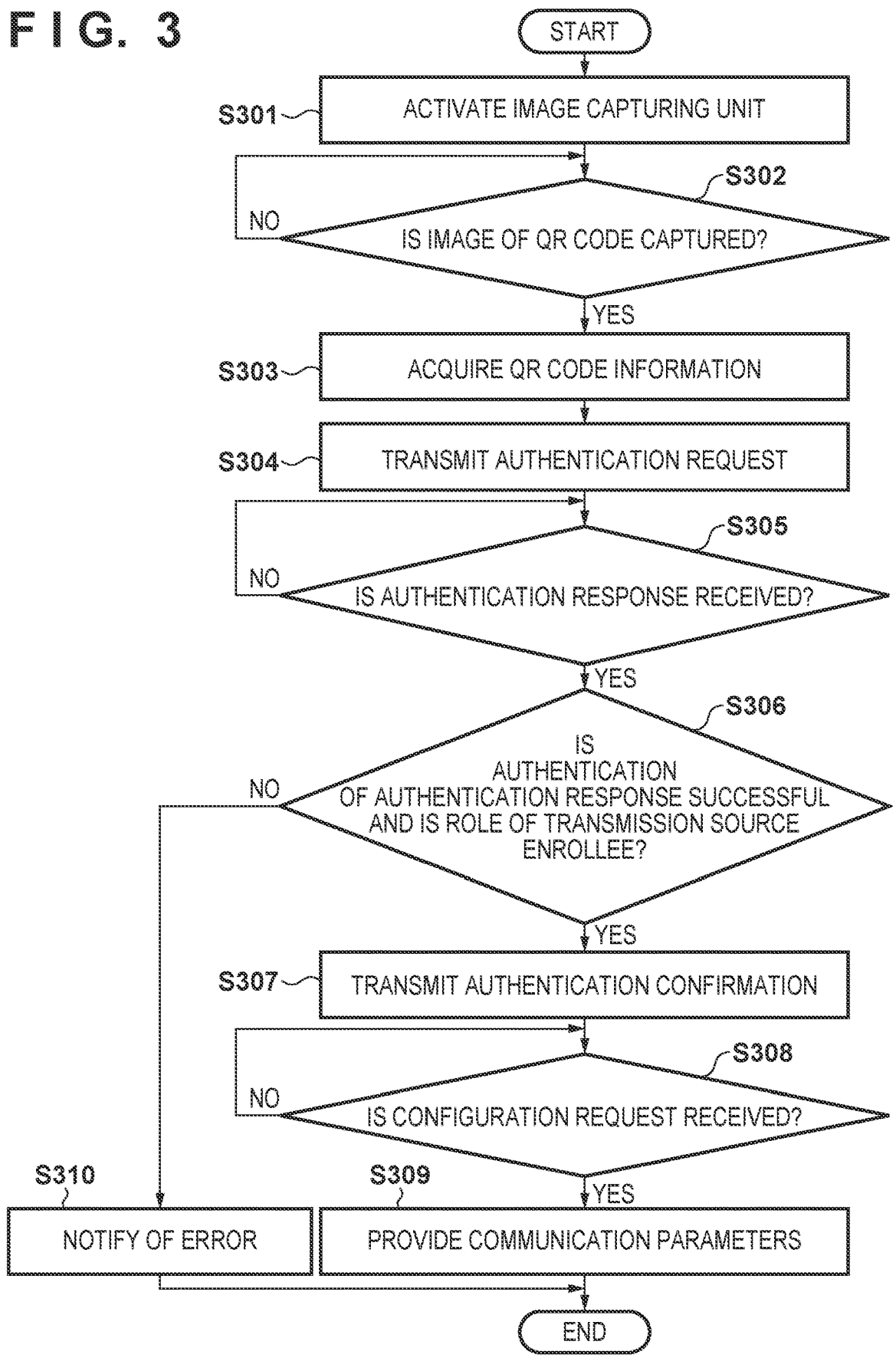
FIG. 3 is a flowchart showing communication parameter providing processing that is performed by the portable device.
Figure 4:
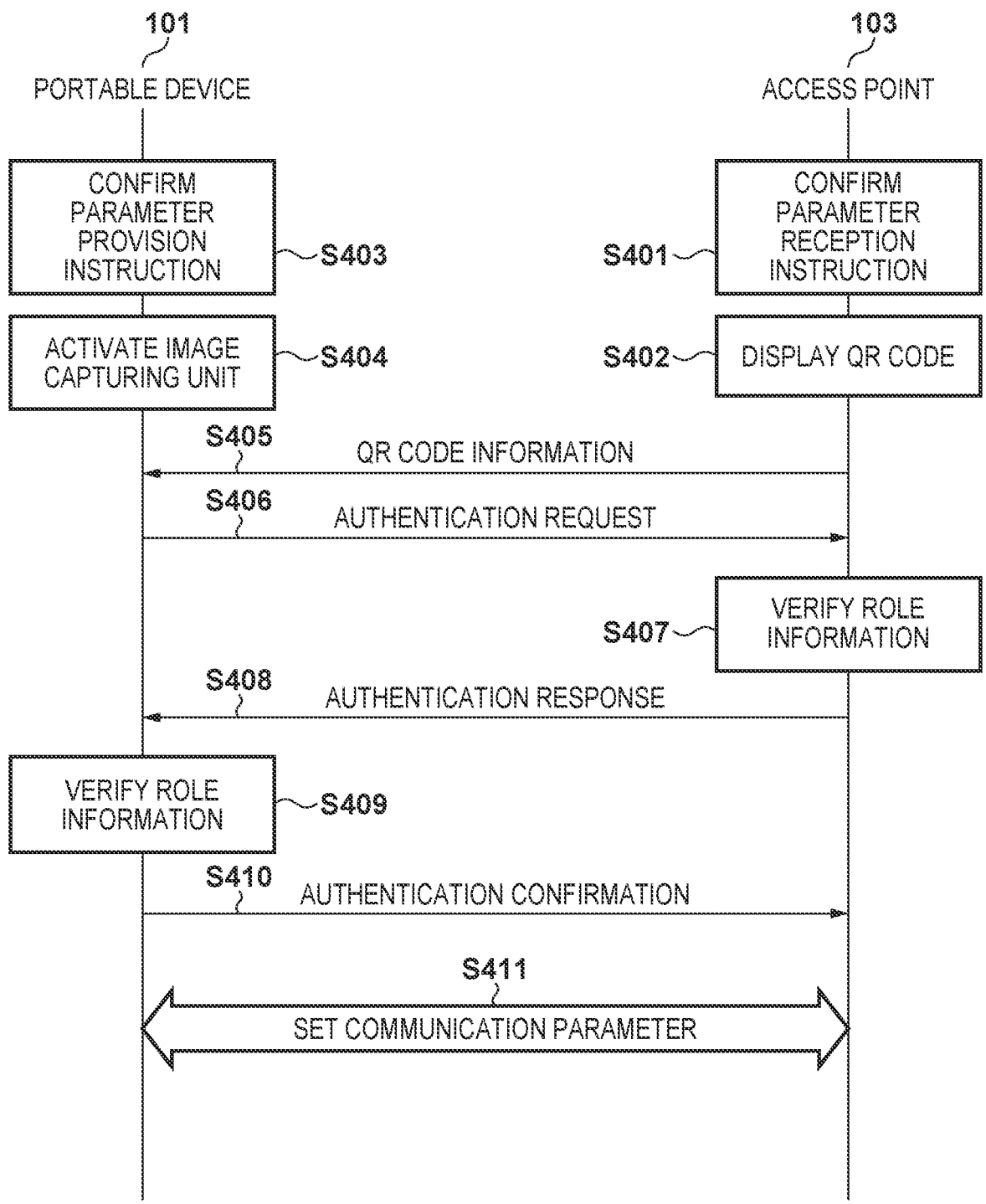
FIG. 4 is a sequence diagram showing communication parameter providing processing that is performed between the portable device and an access point.

In FIG. 3, upon receiving the authentication response (YES in S305), the control unit 205 of the portable device 101 verifies the content of the authentication response (S306). As described above, the control unit 205 determines whether or not authentication is successful, using the tag information included in the authentication response, and determines whether or not the role information regarding the access point 103, included in the access point 103, indicates an enrollee. Upon determining that the authentication has failed, or the role of the access point 103 that has transmitted the authentication response is not indicated as being an enrollee (NO in S306), the control unit 205 displays an error message on the display unit 204 (S310), and terminates parameter providing processing.

Upon determining that authentication is successful and the role of the access point 103 is an enrollee (YES in S306), the control unit 205 transmits an authentication confirmation to the access point 103 (S307). This authentication confirmation is a DPP Authentication Confirm frame defined in the DPP standards, for example. This authentication confirmation includes tag information. Tag information is generated by the control unit 205 encrypting the random number included in the authentication response transmitted by the access point 103, using the shared key. After transmitting the authentication confirmation, the control unit 205 of the portable device 101 waits for a configuration request from the access point 103, which serves as an enrollee (S308).

The access point 103, upon receiving the authentication confirmation, determines that authentication is successful if the tag information included in the authentication confirmation can be properly decrypted using the shared key generated by the access point 103 itself. Upon determining that authentication is successful, the access point 103 confirms that the portable device 101 that has transmitted the authentication request is a configurator, and transmits a configuration request to the portable device 101. This configuration request is a DPP Configuration Request frame defined in the DPP standards, for example. This configuration request includes device information regarding the access point 103 and role information after communication parameters have been received. Device information is the device name of the access point 103, for example. Role information after communication parameters have been received is information that indicates whether the enrollee operates as an access point that establishes a wireless network, or operates as a device that connects to a wireless network. Here, information that indicates that the enrollee operates as an access point that establishes a wireless network is set. Information that is included in the configuration request is encrypted using the shared key that the access point 103 has used to encrypt the tag information when transmitting the authentication response.

Upon receiving the configuration request from the access point 103 (YES in S308), the communication parameter processing unit 210 of the portable device 101 performs communication parameter providing processing in order to form the wireless network 104 (S309), which is a configuration response. This configuration response is a DPP Configuration Response frame defined in the DPP standards, for example. A configuration response that is transmitted by the communication parameter processing unit 210 of the portable device 101 includes communication parameters, the expiration date of the parameters, the configurator-specific public key of the portable device 101, and so on. In a configuration response, communication parameters are encrypted using the configurator-specific private key of the portable device 101. Furthermore, information included in the configuration response is encrypted using the shared key used to encrypt tag information in S307. Note that the communication parameters include the public key of the communication partner, which has been used to generate the shared key (in this case, the public key that is included in the authentication response from the access point 103), as an encryption key.

After transmitting the configuration request, the access point 103, which serves as an enrollee, waits for a configuration response from the portable device 101, which serves as a configurator. Upon receiving a configuration response, the access point 103 decrypts information included in the configuration response, using the shared key used to encrypt the tag information. Furthermore, the access point 103 decrypts the communication parameters encrypted with the configurator-specific private key of the portable device 101, using the configurator-specific public key of the portable device 101. The access point 103 can form a wireless network 104, using the communication parameters obtained as a result of decryption.

The following further describes operations of the portable device 101 and the access point 103 that are performed until the portable device 101, which performs the above-described processing, provides communication parameters to the access point 103. FIG. 4 is a sequence diagram showing processing through which the portable device 101 provides communication parameters to the access point 103.

Upon receiving, from the user, an instruction to receive parameters (S401), the access point 103 displays a QR code on the display (S402), and waits for an authentication request. Note that the access point 103 may stop waiting for an authentication request if the access point 103 cannot receive an authentication request within a predetermined period. In addition, if the access point 103 is not provided with a display or the like for displaying a QR code, and a QR code is printed on a label or the like attached to the housing or an accessory of an electronic device, S402 is to be skipped. That is to say, upon receiving an instruction to receive parameters (S401), the access point 103 waits for an authentication request without performing the processing in S402.

On the other hand, the portable device 101, upon receiving an instruction to provide parameters (S403), activates the image capturing unit 207 in order to capture an image of the QR code displayed by the access point 103 (S404). Thereafter, the image capturing unit 207 of the portable device 101 captures an image of the QR code displayed by the access point 103, to acquire information that is indicated by the QR code (S405).

Upon acquiring information that is indicated by the QR code, the portable device 101 generates and transmits an authentication request, and the access point 103 receives this authentication request (S406). The access point 103 verifies the content of the received authentication request. Upon determining that the portable device 101 that has transmitted the authentication request is the device that has captured the image of the QR code, the access point 103 verifies role information (S407). Upon determining that the role of the device that has transmitted the authentication request is indicated as being a configurator as a result of verifying the role information, the access point 103 generates and transmits an authentication response (S408). Upon transmitting the authentication response to the portable device 101, the access point 103 waits for an authentication confirmation from the portable device 101.

Upon receiving the authentication response, the portable device 101 verifies the content of the authentication response (S409). Upon succeeding in authenticating the authentication response and determining that the role information included in the authentication response indicates an enrollee, the portable device 101 transmits an authentication confirmation to the access point 103 (S410).

Upon receiving the authentication confirmation from the portable device 101 (S410), the access point 103 verifies the content of the authentication confirmation. The access point 103 determines that authentication is successful if the tag information can be properly decrypted using the shared key generated by the access point 103 itself. Upon determining that authentication is successful, the access point 103 performs communication parameter configuration processing together with the portable device 101 (S411). More specifically, the access point 103 transmits a configuration request in order to perform communication parameters configuration processing, and waits for a configuration response from the portable device 101. Upon receiving the configuration request, the portable device 101 transmits a configuration response that includes: communication parameters encrypted with the configurator-specific private key of the portable device 101; and the configurator-specific public key. Upon receiving the configuration response, the access point 103 decrypts the communication parameters, using the configurator-specific public key of the portable device 101. The access point 103 forms the wireless network 104, using the decrypted communication parameters.

Through the processing described above with reference to FIGS. 3 and 4, the portable device 101 can provide communication parameters to the access point 103. In addition, through processing that is similar to the processing described with reference to FIGS. 3 and 4, the portable device 101, which serves as a configurator, can provide communication parameters to the printer 105, which serves as an enrollee. However, the shared key that is used to encrypt tag information, for example, is different from the shared key generated with involvement of the portable device 101 and the access point 103. This is because the shared key generation key pair of the printer 105 is different from the shared key generation key pair of the access point 103. Also, items included in the communication parameters are also different. This is because the communication parameters that the printer 105 receives from the portable device 101 do not include the public key for shared key generation of the access point 103, and include the public key for shared key generation of the printer 105 itself.

Figure 5:
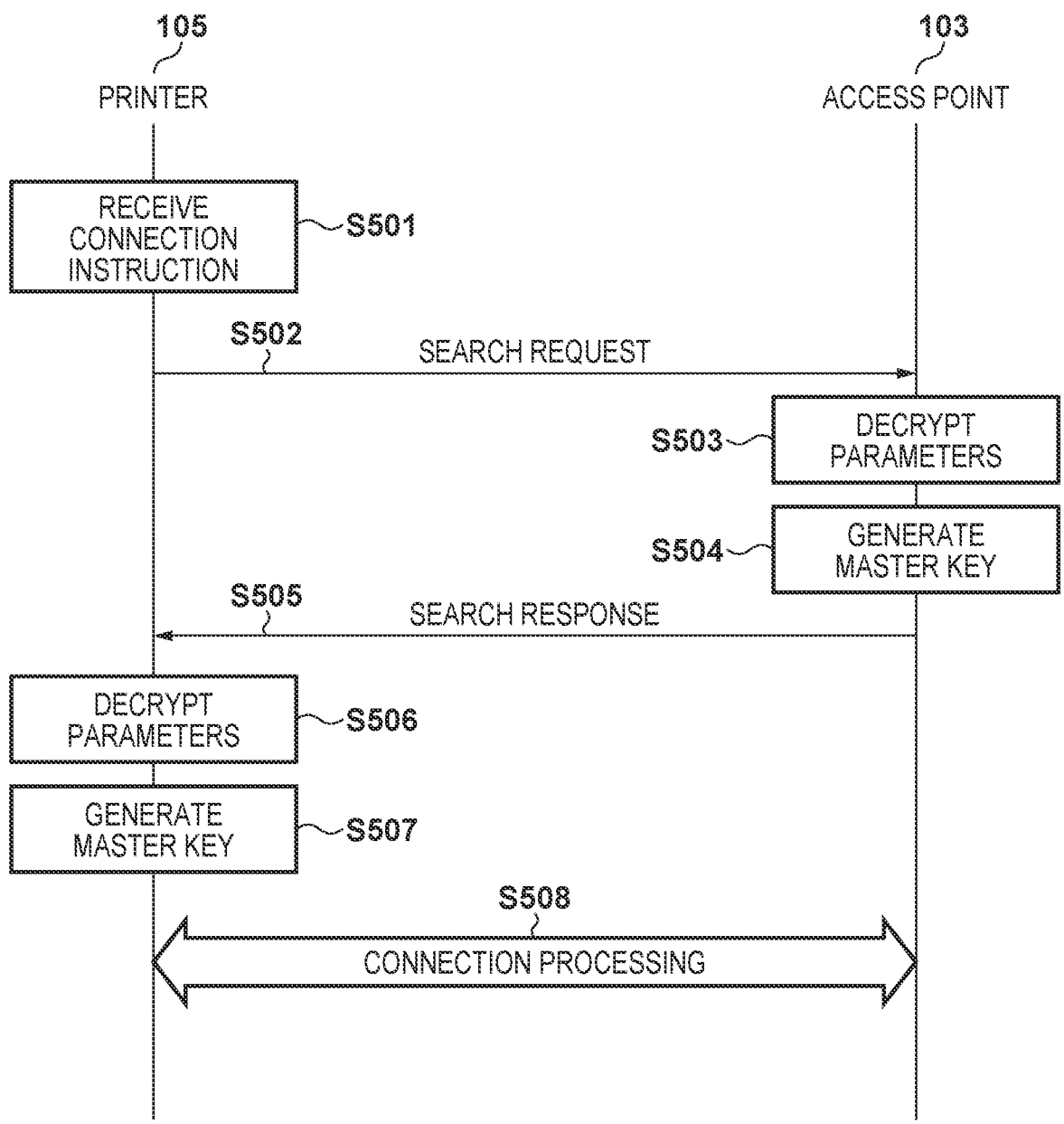
FIG. 5 is a sequence diagram showing wireless connection processing that is performed between a printer and the access point.

The following describes processing through which the printer 105, which has acquired communication parameters from the portable device 101, which serves as a configurator, connects to the wireless network 104 formed by the access point 103. FIG. 5 is a sequence diagram showing processing through which the printer 105 connects to the wireless network 104 formed by the access point 103.

Upon receiving, from the user, an instruction to connect to the wireless network 104 (S501) the printer 105 transmits a search request (S502). This search request is a DPP Peer Discovery Request frame defined in the DPP standards, for example. This search request includes the communication parameters acquired by the printer 105 from the portable device 101. The communication parameters are encrypted with the configurator-specific private key of the portable device 101, as described above.

Upon receiving the search request, the access point 103 decrypts the communication parameters included in the search request, using the configurator-specific public key of the portable device 101 acquired in S411 (S503). Note that the access point 103 discards the search request if the access point 103 cannot decrypt the communication parameters. Upon decrypting the communication parameters, the access point 103 generates a master key (PMK (Pairwise Master Key)) that is to be shared with the printer 105 (S504). This master key is a source of various keys according to the encryption standards called WPA (Wi-Fi Protected Access), and is used to establish wireless connection. The master key is generated using both the public key for shared key generation of the printer 105, included in the communication parameters, and the private key for shared key generation of the access point 103.

Upon generating the master key in S504, the access point 103 transmits a search response (S505). This search response is a DPP Peer Discovery Response frame defined in the DPP standards, for example. This search response includes the communication parameters acquired by the access point 103 from the portable device 101 in S411. Similarly, the communication parameters are encrypted with the configurator-specific private key of the portable device 101.

Upon receiving the search response, the printer 105 decrypts the communication parameters included in the search response, using the configurator-specific public key acquired from the portable device 101 (S506). Note that the printer 105 discards the search response if the printer 105 cannot decrypt the communication parameters. Upon decrypting the communication parameters, the printer 105 generates a master key that is to be shared with the access point 103 (S507). The master key is generated using both the public key for shared key generation of the access point 103, included in the communication parameters, and the private key for shared key generation of the printer 105. Upon sharing the master key, the printer 105 and the access point 103 perform connection processing, using the master key (S508). Thus, the printer 105 can connect to the wireless network 104 formed by the access point 103.

Next, consideration is given to a case in which, in addition to the portable device 101, the portable device 102 also serves as a configurator that provides communication parameters that are used to connect to the wireless network 104 formed by the access point 103. In such a case, the portable device 102 needs to acquire the configurator-specific key pair of the portable device 101 used by the portable device 101 to encrypt the communication parameters. To describe the reasons therefor, consideration is given to a case in which the portable device 102, which does not hold the configurator-specific key pair of the portable device 101, provides the communication parameters acquired from the portable device 101 as an enrollee, to the printer 106.

For example, the portable device 102 provides communication parameters that are still encrypted with the configurator-specific private key of the portable device 101, to the printer 106. The printer 106 transmits a search request that includes the acquired communication parameters, to the access point 103. Upon receiving the search request, the access point 103 decrypts the communication parameters, using the configurator-specific public key of the portable device 101. However, the public key included in the communication parameters is the public key for shared key generation of the portable device 102. The access point 103 generates a master key, using both the public key for shared key generation of the portable device 102, included in the communication parameters, and the private key for shared key generation of the access point 103. On the other hand, the printer 106 generates a master key, using both the public key for shared key generation of the access point 103, included in the communication parameters transmitted from the access point 103, and the private key for shared key generation of the printer 106. Therefore, the master key generated with involvement of the access point 103 and the printer 106 is a different key, and wireless connection cannot be established.

Also, for example, if the portable device 102 encrypts the communication parameters that have been decrypted using the configurator-specific public key of the portable device 101, using the configurator-specific private key of the portable device 102, and provides them to the printer 106, the printer 106 transmits a search request that includes the communication parameters acquired from the portable device 102, to the access point 103. Upon receiving the search request, the access point 103 attempts to decrypt the communication parameters. However, the access point 103 cannot decrypt the communication parameters, using the configurator-specific public key of the portable device 101, and therefore discards the search request. As a result, the printer 106 cannot connect to the wireless network 104.

For these reasons, in order for the portable device 102 to operate as a configurator that provides communication parameters that are used to connect to the wireless network 104, the portable device 102 needs to acquire the configurator-specific key pair of the portable device 101. The following describes processing through which the configurator-specific key pair of the portable device 101, which is used to encrypt and decrypt the communication parameters that are used to connect to the wireless network 104, is provided from the portable device 101 to the portable device 102. Note that the first embodiment describes processing through which the portable device 102 requests that the portable device 101 share the configurator-specific key pair of the portable device 101 used to set the access point 103.

Figure 6:
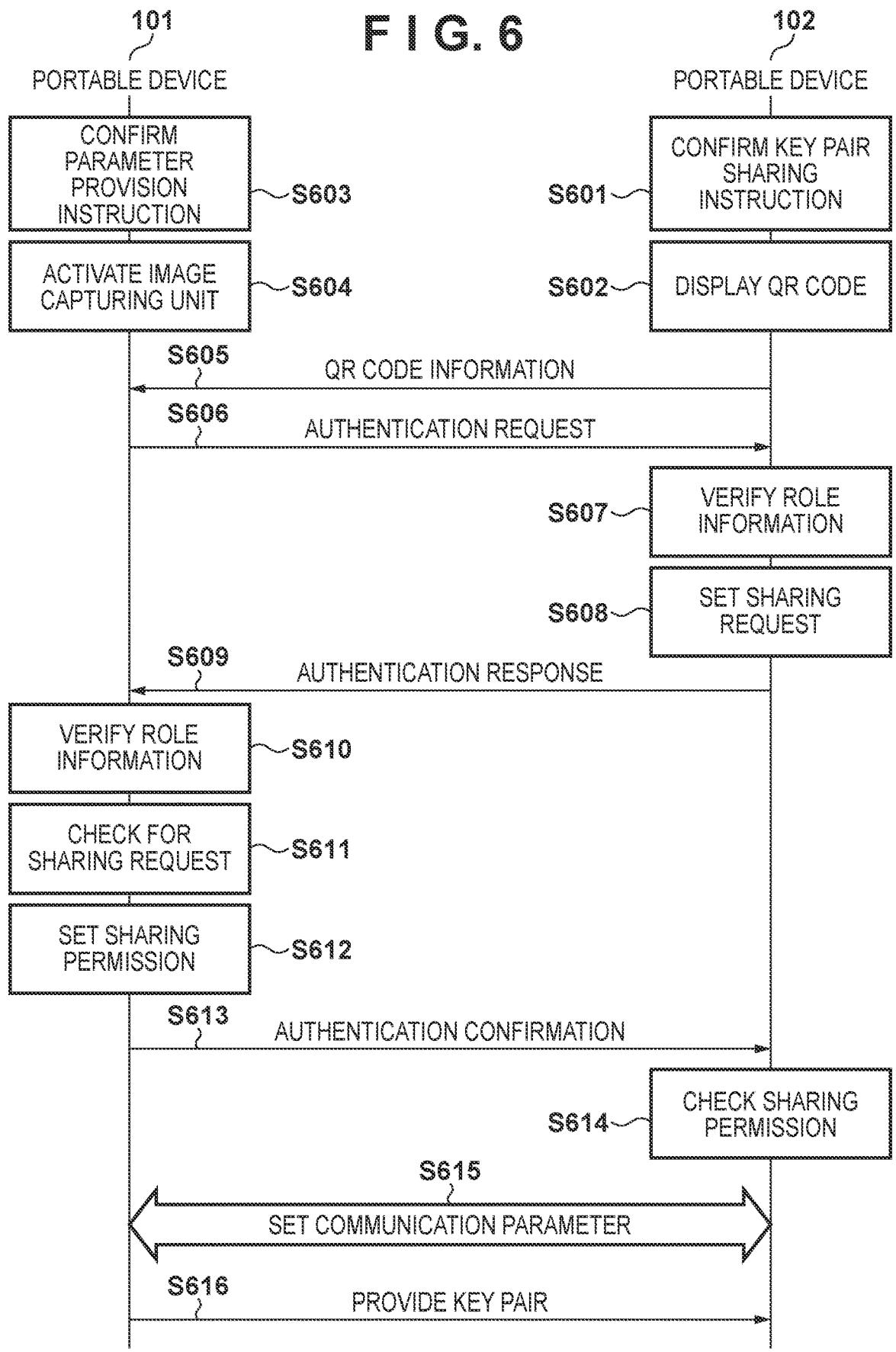
FIG. 6 is a sequence diagram showing key pair sharing processing according to a first embodiment.

FIG. 6 is a sequence diagram showing processing that is performed between the portable device 101 and the portable device 102 according to the present embodiment. The portable device 101 and the portable device 102 can communicate with the portable device 102 and the portable device 101, respectively, which are external devices.

To operate as a configurator that provides communication parameters that are used to connect to the wireless network 104, the portable device 102 receives, from the user, an instruction to share the configurator-specific key pair of the portable device 101 (S601). Thereafter, the portable device 102 displays the QR code on its own display unit 204, and waits for an authentication request (S602). On the other hand, the portable device 101, upon receiving, from the user, an instruction to start providing parameters (S603), captures an image of the QR code displayed by the portable device 102, to acquire QR code information (S604, S605). S606, S609, and S613 are the steps of authentication processing through which the portable device 101 and the portable device 102 exchange frames that include pieces of information (in the present embodiment, authentication information, a random number, and tag information) that are used to authenticate each other. During this authentication processing, a request for sharing unique information that is used by the configurator to provide communication parameters (in the present embodiment, the private key of the configurator), and permission given in response to the request, are transmitted to each other.

The portable device 101 generates and transmits an authentication request based on the acquired QR code information (S606). The processing performed through S603 to S606 is the same as the processing performed through S403 to S406 described with reference to FIG. 4. Upon receiving the authentication request (S606), the portable device 102 verifies the content of the authentication request. The portable device 102 verifies authentication information that is included in the authentication request. Upon determining that the portable device 101 that has transmitted the authentication request is the device that has captured the image of the QR code (successful authentication), the portable device 102 verifies role information that is included in the authentication request (S607). Upon determining that the role information included in the authentication request transmitted by the portable device 101 indicates a configurator, the portable device 102 performs processing to include information that indicates a key pair sharing request, in an authentication response (S608). A key pair sharing request is expressed by setting a predetermined bit of the DPP Authentication Response frame, for example. Although it is stated here that a predetermined bit is used to express a request for a key pair, the present invention is not limited in this way. For example, role information that is to be included in an authentication response may indicate a role other than a configurator, which indicates a "parameter providing apparatus" or an enrollee, which indicates a "parameter receiving apparats". For example, the role information may indicate a "key pair receiving device". The portable device 102 transmits the thus generated authentication response that includes a key pair sharing request (S609). After transmitting the authentication response, the portable device 102 waits for an authentication confirmation from the portable device 101 that has transmitted the authentication request.

Upon receiving the authentication response (S609) and succeeding in authentication using tag information, the portable device 101 verifies role information regarding the portable device 102 included in the authentication response (S610). Through verification of the role information, if the portable device 101 determines that the role of the device that transmitted the authentication response is an enrollee (or a "role indicating a key pair receiving device"), the portable device 101 continues parameter providing processing. On the other hand, if the role information indicates a role other than the above-described role, the portable device 101 terminates parameter providing processing.

The portable device 101 that continues parameter providing processing checks whether or not a key pair sharing request is included in the authentication response (S611). If a key pair sharing request is included in the authentication response, the portable device 101 notifies the user by displaying, on the display unit 204, information that indicates the presence of a key pair sharing request, and waits for an instruction from the user using the operation unit 203 to permit sharing a key pair. Upon being permitted by the user to share a key pair, the portable device 101 includes information that indicates key pair sharing permission, in an authentication confirmation (S612). Key pair sharing permission is expressed by setting a predetermined bit of the DPP Authentication Confirm frame, for example. The portable device 101 transmits an authentication confirmation in which information that indicates key pair sharing permission is included, to the portable device 102 (S613).

In the above description, information that indicates the presence of a key pair sharing request is displayed on the display unit 204, and a key pair is shared on the condition that a permission instruction from the user using the operation unit 203 is received. However, note that the present invention is not limited in this way. For example, processing may be performed to include information that indicates key pair sharing permission in the authentication confirmation, without receiving a permission instruction from the user. If this is the case, the display of information that indicates the presence of a key pair sharing request may be omitted.

On the other hand, if the user does not permit to share a key pair, key pair providing processing described below (S616) is not performed. Alternatively, if key pair sharing is not permitted, it is possible not to transmit an authentication confirmation so as to terminate processing without performing parameter providing processing. Furthermore, if key pair sharing is not permitted, a message that includes information indicating that key pair sharing is not permitted may be transmitted to the portable device 102.

Upon receiving the authentication confirmation, the portable device 102 checks information that indicates key pair sharing permission, included in the authentication confirmation (S614). If information that indicates key pair sharing permission is not included in the authentication confirmation, the portable device 102 terminates parameter receiving processing. Note that if information that indicates key pair sharing permission is not included in the authentication confirmation, the portable device 102 may notify the user by displaying an error message on the display unit 204.

Upon authentication using the authentication confirmation being complete, communication parameter setting is performed (S615). More specifically, after completing authentication using the authentication confirmation, the portable device 102 transmits a configuration request to the portable device 101. In response to this configuration request, the portable device 101 transmits a configuration response that includes communication parameters to the portable device 102. Thus, communication parameter providing processing is performed. Upon communication parameter providing processing being complete, the portable device 101 encrypts the configurator-specific private-public key pair of the portable device 101, using the shared key shared between the portable device 101 and the portable device 102, and transmits the encrypted key pair to the portable device 102 (S616). Note that the configuration response transmitted in S615 includes the configurator-specific public key of the portable device 101, and therefore only the private key may be transmitted in S616. Also, in the parameter providing processing performed in S615, the portable device 101 may transmit a configuration response that includes the configurator-specific private key of the portable device 101. If this is the case, the processing in S616 is unnecessary.

After transmitting the authentication confirmation in S613, the portable device 101 may provide the configurator-specific key pair of the portable device 101 before the communication parameter providing processing in S615 has been completed. Furthermore, even if the portable device 101 transmits an authentication confirmation that does not include information that indicates key pair sharing permission, the portable device 101 may provide the configurator-specific key pair of the portable device 101.

Upon receiving the configurator-specific private-public key pair of the portable device 101 used to set the access point 103, the portable device 102 can provide communication parameters, as a configurator, to the printer 106, which serves as an enrollee. The printer 106 performs the processing shown in the sequence diagram in FIG. 5, using the communication parameters acquired from the portable device 102, and thus the printer 106 can connect to the wireless network 104 formed by the access point 103.

Note that, in S603, if the portable device 101 receives an instruction to start key pair sharing instead of an instruction to start providing parameters, the portable device 101 may perform processing to include information that indicates key pair sharing permission in the authentication confirmation, without waiting for a permission instruction from the user in S612.

Note that it is possible to only provide a key pair without providing communication parameters, i.e. without performing the parameter setting in S615. If this is the case the communication parameter providing processing in S615 can be omitted, which improves user convenience. Such processing through which only a key pair is provided may be performed when an instruction to only pass a key pair is input by the user in S612. In S603, if the portable device 101 receives an instruction to start key pair sharing instead of an instruction to start providing parameters, the portable device 101 may perform processing to only provide a key pair without waiting for a permission instruction from the user in S612. Also, in the processing shown in the sequence diagrams in FIGS. 9 to 11, it is possible to perform key pair providing processing without performing communication parameter providing processing.

Figure 7:
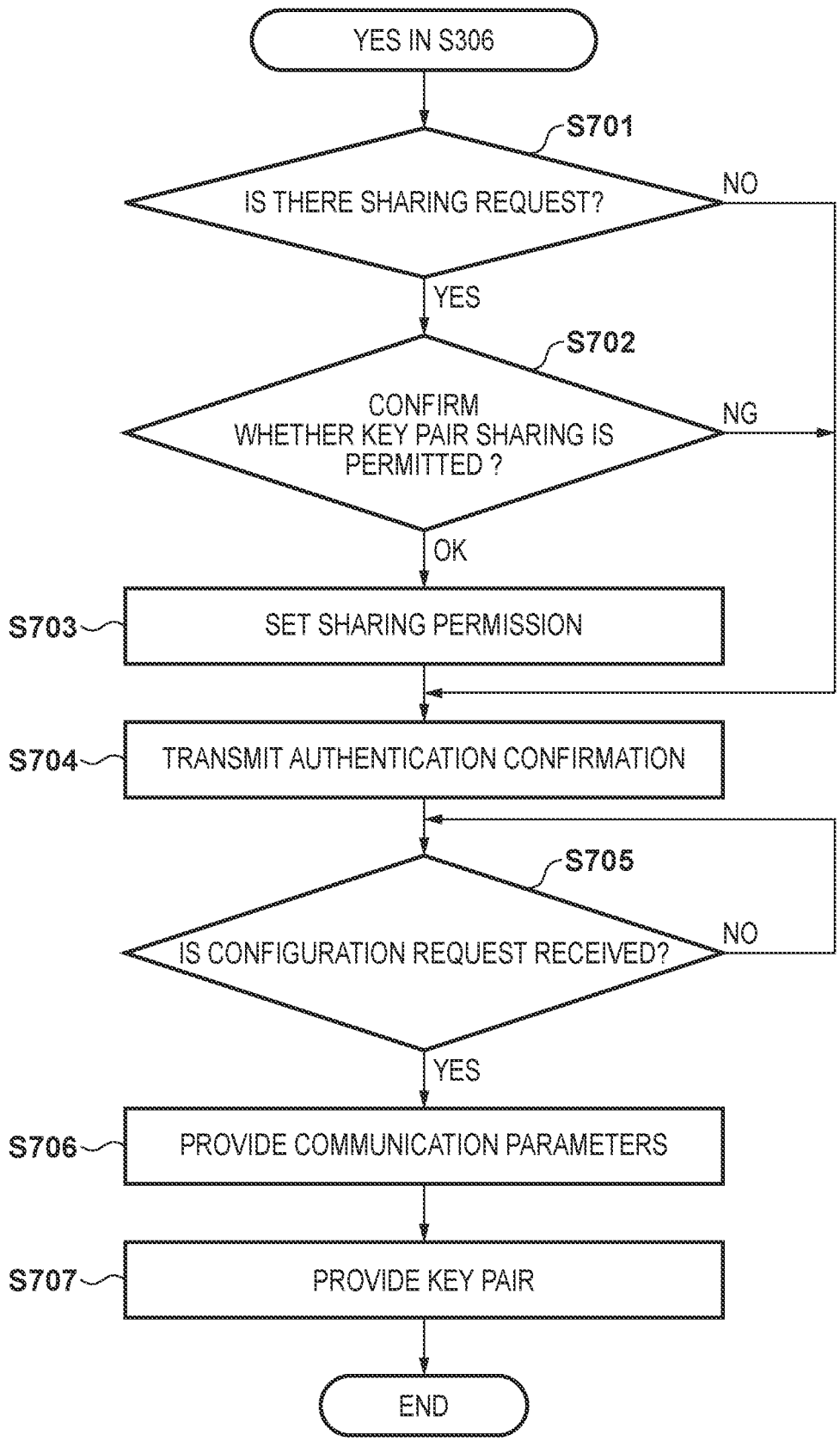
FIG. 7 is a flowchart showing operations performed by a portable device 101 according to the first embodiment.
Figure 8:
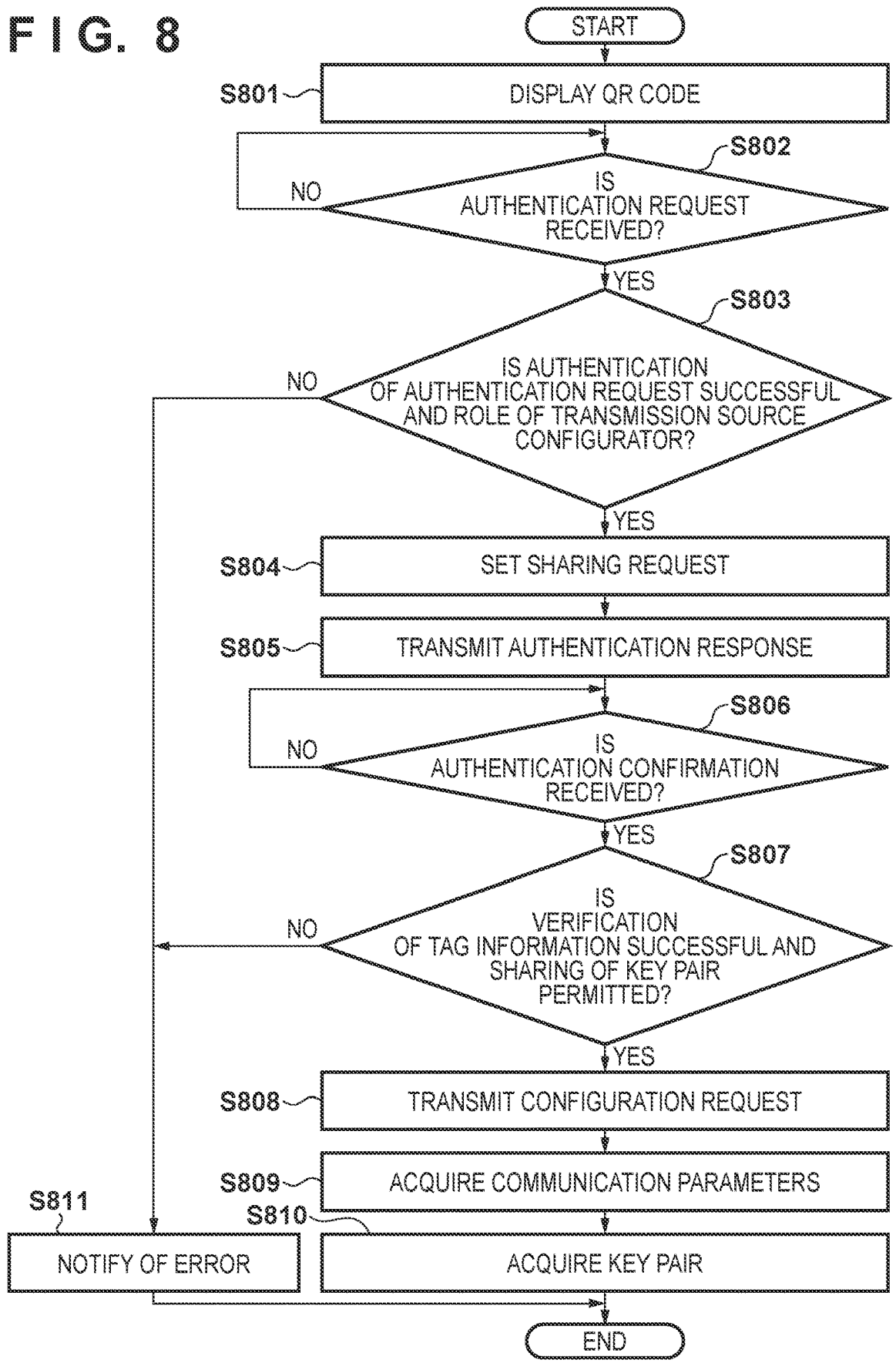
FIG. 8 is a flowchart showing operations performed by a portable device 102 according to the first embodiment.

The following describes processing that is performed by the portable device 101 and the portable device 102 with reference to the flowcharts shown in FIGS. 7 and 8.

FIG. 7 is a flowchart showing processing through which the portable device 101 provides a configurator key pair (a private key and a public key) held by the portable device 101 itself, to the portable device 102, in response to a request from the portable device 102. Processing from the step of activating the image capturing unit 207 to the step of verifying the authentication response is the same as the processing shown in FIG. 3 (S301 to S306). FIG. 7 shows processing that is performed after the verification using an authentication response has been successful and it has been determined that role information indicates an enrollee in FIG. 3 (YES in S306).

Regarding the authentication response transmitted by the portable device 102, if the role is an enrollee and the verification of tag information is successful, the control unit 205 of the portable device 101 determines whether or not there is a key pair sharing request in the authentication response (S701). If it has been determined that there is a key pair sharing request, the control unit 205 asks the user whether or not to share a key pair, using the display unit 204 and the operation unit 203 (S702). If the user has permitted to share the key pair (OK in S702), the key sharing processing unit 212 sets information that indicates a share permission, to an authentication confirmation (S703), and transmits it to the portable device 102 (S704). On the other hand, if it has been determined that there is no key pair sharing request in the authentication response (NO in S701), or the user does not permit to share a key pair (NG in S702), the key sharing processing unit 212 skips S703 and transmits an authentication confirmation without information that indicates a share permission, to the portable device 102 (S704).

Thereafter, the control unit 205 waits for a configuration request from the portable device 102 (S705). Upon the configuration request being received, the communication parameter processing unit 210 provides communication parameters to the portable device 102 (S706). This providing processing is the same as that in S310. Next, the key sharing processing unit 212 provides a key pair, which consists of the private key and the public key of the configurator, to the portable device 102 (S707). Note that the key pair is encrypted using the shared key. Also, as shown in S807 of FIG. 8 described below, if a sharing permission is not set in S703, the configuration request will not be received and the key pair will not be shared. However, for the sake of safety, the key pair may be provided in S707 only when a providing permission has been set in S703.

FIG. 8 is a flowchart showing processing through which the portable device 102 receives, from the user, an instruction to share the key pair held by the portable device 101, and acquires the configurator-specific key pair of the portable device 101, which has been used in the configuration processing for the access point 103.

Upon receiving, from the user, an instruction to share the configurator-specific key pair of the portable device 101 held by the portable device 101, via the operation unit 203, the code generation unit 209 of the portable device 102 generates a QR code and displays it on the display unit 204 (S801). Thereafter, the control unit 205 waits for an authentication request (S802). Note that the access point 103 may stop waiting for an authentication request if the access point 103 cannot receive an authentication request within a predetermined period.

Upon receiving the authentication request from the portable device 101, the control unit 205 performs authentication using authentication information that is included in the received authentication request, and the role determination unit 211 verifies role information to determine the role that is indicated by the role information. The control unit 205 determines whether or not the authentication performed using the authentication information is successful and whether or not the role determined by the role determination unit 211 is a configurator (S803). If it has been determined that the authentication has failed or the role of the portable device 101 is not a configurator, the control unit 205 displays an error message on the display unit 204 (S811), and terminates processing. Note that display of an error message (S811) may be omitted.

On the other hand, if it has been determined that authentication is successful in S803, and it has been determined that the role of the portable device 101 that has transmitted the authentication request is a configurator, the key sharing processing unit 212 sets information that indicates a key pair sharing request, to the authentication response (S804). Thereafter, the control unit 205 transmits an authentication response to which a sharing request is set, to the portable device 101 (S805), and waits for an authentication confirmation from the portable device 101.

Upon receiving the authentication confirmation from the portable device 101 (S806), the control unit 205 determines whether or not authentication performed using tag information that is included in the authentication confirmation has been successful and whether or not information that indicates key pair sharing permission is included in the authentication confirmation (S807). If it has been determined that the authentication has been successful and information that indicates key pair sharing permission is included in the authentication confirmation, the communication parameter processing unit 210 transmits a configuration request to the portable device 101 (S808). Thereafter, the communication parameter processing unit 210 acquires communication parameters by receiving the configuration response from the portable device 101 (S809). The key sharing processing unit 212 acquires the configurator-specific key pair of the portable device 101 (S810). On the other hand, if it has been determined in S807 that verification of the tag information has failed or information that indicates key pair sharing permission is not included in the authentication confirmation, the control unit 205 displays an error message on the display unit 204, and terminates processing (S811).

Modification 1

Figure 9:
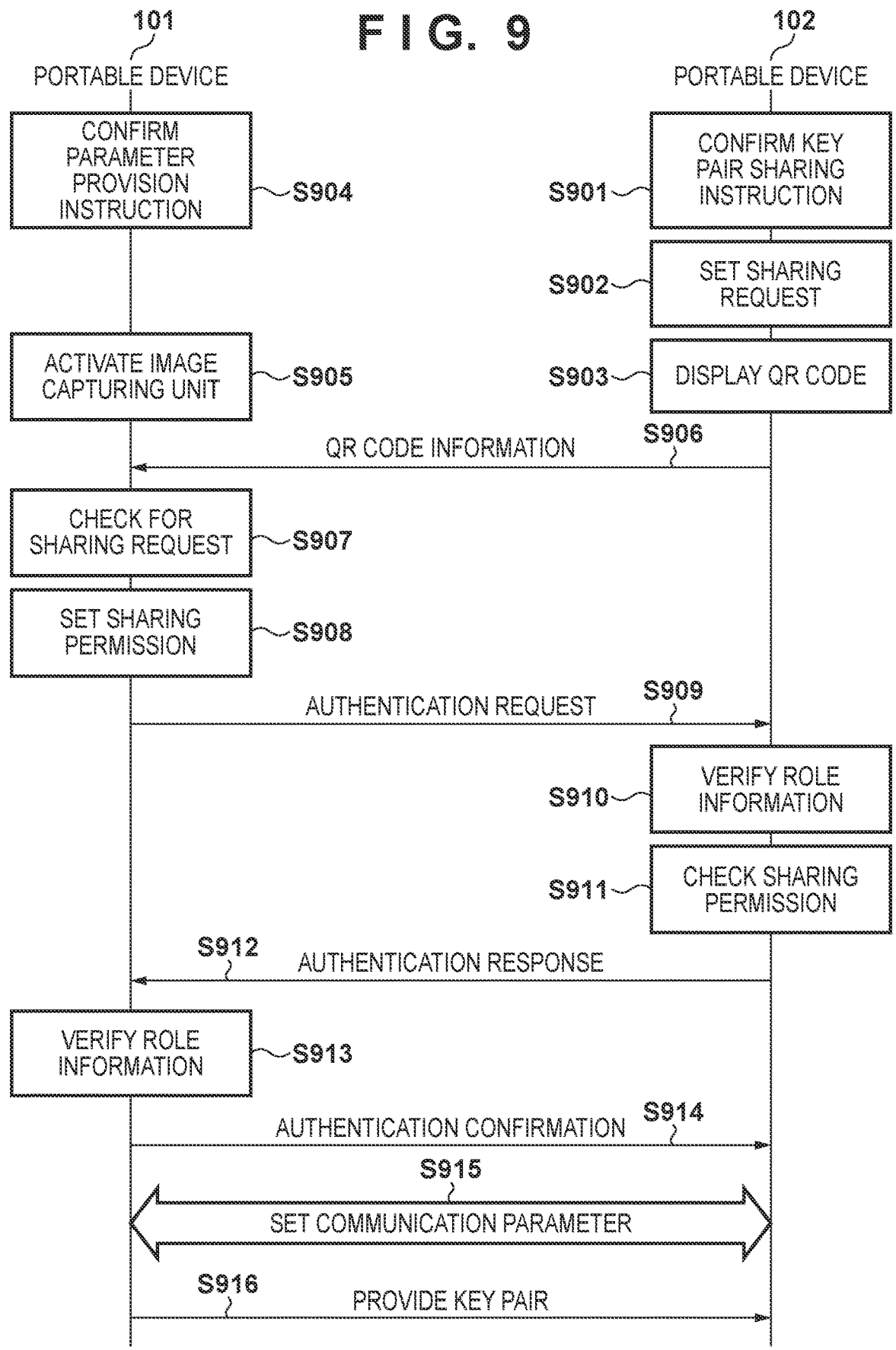
FIG. 9 is a sequence diagram showing another example of key pair sharing processing according to the first embodiment.

FIG. 6 shows an example in which a request (a sharing request) for sharing unique information (a key pair in the present embodiment) that is used by a configurator to provide communication parameters, is detected from a frame that is used by the portable device 101 and the portable device 102 to exchange information for authentication. However, a method for notifying the portable device 101 of a sharing request is not limited to this method. For example, it is possible to use an Action frame that includes information that indicates a key pair sharing request that is addressed to the portable device 101 to notify the portable device 101, or use a QR code to notify the portable device 101 of a key pair sharing request. FIG. 9 is a sequence diagram showing processing thorough which information that indicates a key pair sharing request is included in a QR code.

To operate as a configurator that provides communication parameters that are used to connect to the wireless network 104, the portable device 102 receives, from the user, an instruction to share the configurator-specific key pair of the portable device 101 (S901). Upon receiving an instruction to share a key pair, the portable device 102 embeds information that indicates a key pair sharing request into a QR code (S902) and displays it (S903). Processing that is performed from S904 to S906, through which the portable device 101 acquires QR code information displayed by the portable device 102, is the same as the processing performed from S403 to S405 in FIG. 4. Note that a QR code that contains a sharing request may be provided on printed matter, for example.

The portable device 101 confirms that there is a key pair sharing request in the acquired QR code information (S907). If key pair sharing is to be permitted, the portable device 101, upon confirming the presence of the key pair sharing request, includes information that indicates key pair sharing permission in the authentication request (S908), and transmits it to the portable device 102 (S909). The processing performed in S907 and S908 is the same as the processing performed in S611 and S612, respectively.

Upon receiving the authentication request (S909) and succeeding in authentication using authentication information that is included in the authentication request (determining that the portable device 101 that has transmitted the authentication request is the portable device 101 that has captured the image of the QR code), the portable device 102 verifies role information that is included in the authentication request (S910). Upon confirming that the portable device 101 is a configurator by verifying authentication information, the portable device 102 checks information that indicates key pair sharing permission, included in the authentication request (S911). Key pair sharing permission is expressed by setting a predetermined bit of the DPP Authentication Request frame, for example. Note that a method for indicating key pair sharing permission in an authentication request is not limited to this method. For example, key pair sharing permission may be indicated by setting role information included in the authentication request so as to indicate that the role is a "key pair providing device" instead of being a configurator that represents a "parameter providing device".

Upon confirming the presence of information that indicates key pair sharing permission in the authentication request, the portable device 102 transmits an authentication response (S912), and waits for an authentication confirmation from the portable device 101. On the other hand, the portable device 101, upon receiving the authentication response, verifies tag information that is included in the authentication response, and role information regarding the portable device 102 (S913). If it has been determined that the tag information has been properly decrypted and the authentication has been successful, and the role information indicates an enrollee, the portable device 101 transmits an authentication confirmation (S914). Upon authentication being complete in this way, communication parameter providing processing is performed using a configuration request and a configuration response. The processing performed through S915 to S916, which is communication parameter setting processing and key pair providing processing, is the same as the processing performed through S615 to S616 shown in FIG. 6.

As described above, through the processing described with reference to FIG. 9, it is possible to share the configurator-specific key pair of the portable device 101 by providing a key pair sharing request, using a QR code.

Modification 2

Figure 10:
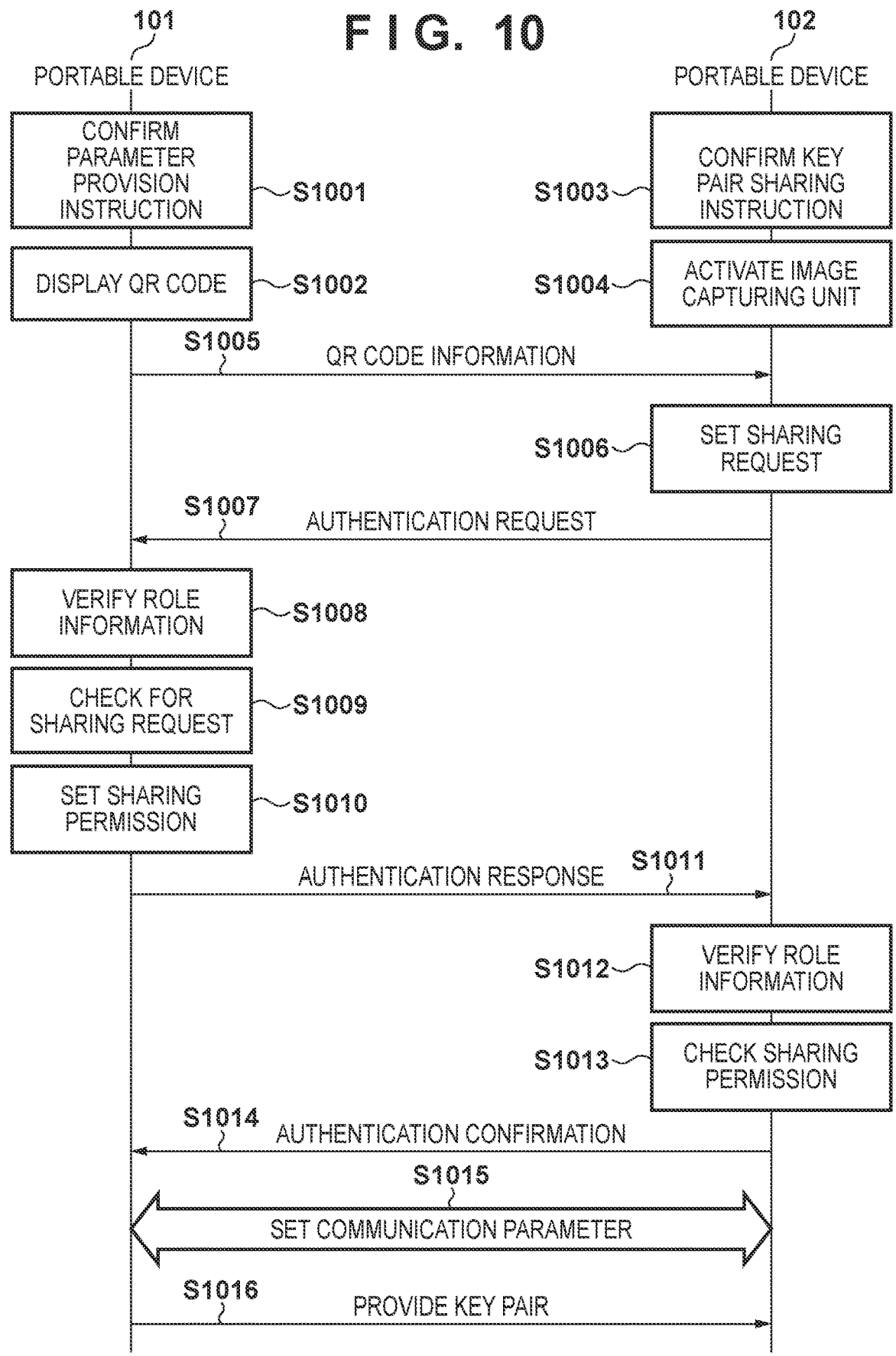
FIG. 10 is a sequence diagram showing another example of key pair sharing processing according to the first embodiment.

According to the processing described with reference to FIG. 6, the portable device 102 that requests key pair sharing displays a QR code. However, the present invention is not limited in this way. Even if the portable device 101 displays a QR code, the portable device 102 may request that the portable device 101 perform key pair sharing. FIG. 10 is a sequence diagram showing processing through which the portable device 101 displays a QR code and the portable device 102 requests a key pair from the portable device 101.

Upon receiving, from the user, an instruction to provide parameters (S1001), the portable device 101 displays a QR code on the display unit 204 thereof, and waits for an authentication request (S1002). On the other hand, in order to operate as a configurator that provides communication parameters that are used to connect to the wireless network 104, the portable device 102 receives, from the user, an instruction to share the configurator-specific key pair of the portable device 101 (S1003). In response to this instruction, the portable device 102 activates the image capturing unit 207 to capture an image of the QR code (S1004). The portable device 102 captures an image of the QR code displayed on the display unit 204 of the portable device 101, using the image capturing unit 207 of the portable device 102, and acquires information that is indicated by the QR code (S1005). The portable device 102 generates an authentication request, using the QR code information, includes information that indicates a key pair sharing request in the authentication request (S1006), and transmits it to the portable device 101 (S1007). A key pair sharing request is expressed by setting a predetermined bit of the DPP Authentication Request frame, for example.

Upon receiving the authentication request and succeeding in authentication using authentication information that is included in the authentication request, the portable device 101 verifies role information that is included in the authentication request (S1008). Upon confirming that the role information indicates an enrollee through this verification, the portable device 101 determines whether or not the authentication request includes a key pair sharing request (S1009). Upon confirming that the authentication request includes a key pair sharing request, the portable device 101 includes information that indicates key pair sharing permission in an authentication response (S1010), and transmits it to the portable device 102 (S1011). Key pair sharing permission is expressed by setting a predetermined bit of the DPP Authentication Response frame, for example. The processing performed in S1009 and S1010 is the same as the processing performed in S611 and S612.

Upon receiving the authentication response, the portable device 102 verifies tag information and role information that are included in the authentication response (S1012). If the authentication using the tag information is successful and the role information indicates a configurator, the portable device 102 checks whether or not the authentication response includes key pair sharing permission (S1013). Upon confirming the presence of the key pair sharing permission, the portable device 102 transmits an authentication confirmation to the portable device 101 (S1014). Upon authentication being complete in this way, communication parameter providing processing (S1015) and key pair providing processing (S1016) are performed. The processing performed through S1015 to S1016, which is communication parameter setting processing and key pair providing processing, is the same as the processing performed through S615 to S616 shown in FIG. 6.

As described above, through the processing described with reference to FIG. 10, it is possible to share the configurator-specific key pair of the portable device 101 even in a case in which the portable device 101 displays a QR code.

As described above, according to the first embodiment, it is possible to share the configurator-specific private-public key pair of the portable device 101 used to set the access point 103, based on a request from the portable device 102 to the portable device 101. As a result of sharing the key pair, it is possible to duplicate the configurator that distributes communication parameters that are used to connect to the wireless network 104, which improves user convenience.

Second Embodiment

The first embodiment describes a case in which the portable device 102 requests that the portable device 101 share the configurator-specific key pair of the portable device 101 used to set the access point 103. A second embodiment describes processing that is performed in a case in which the portable device 101 requests that the portable device 102 share the configurator-specific key pair of the portable device 101 used to set the access point 103.

Figure 11:
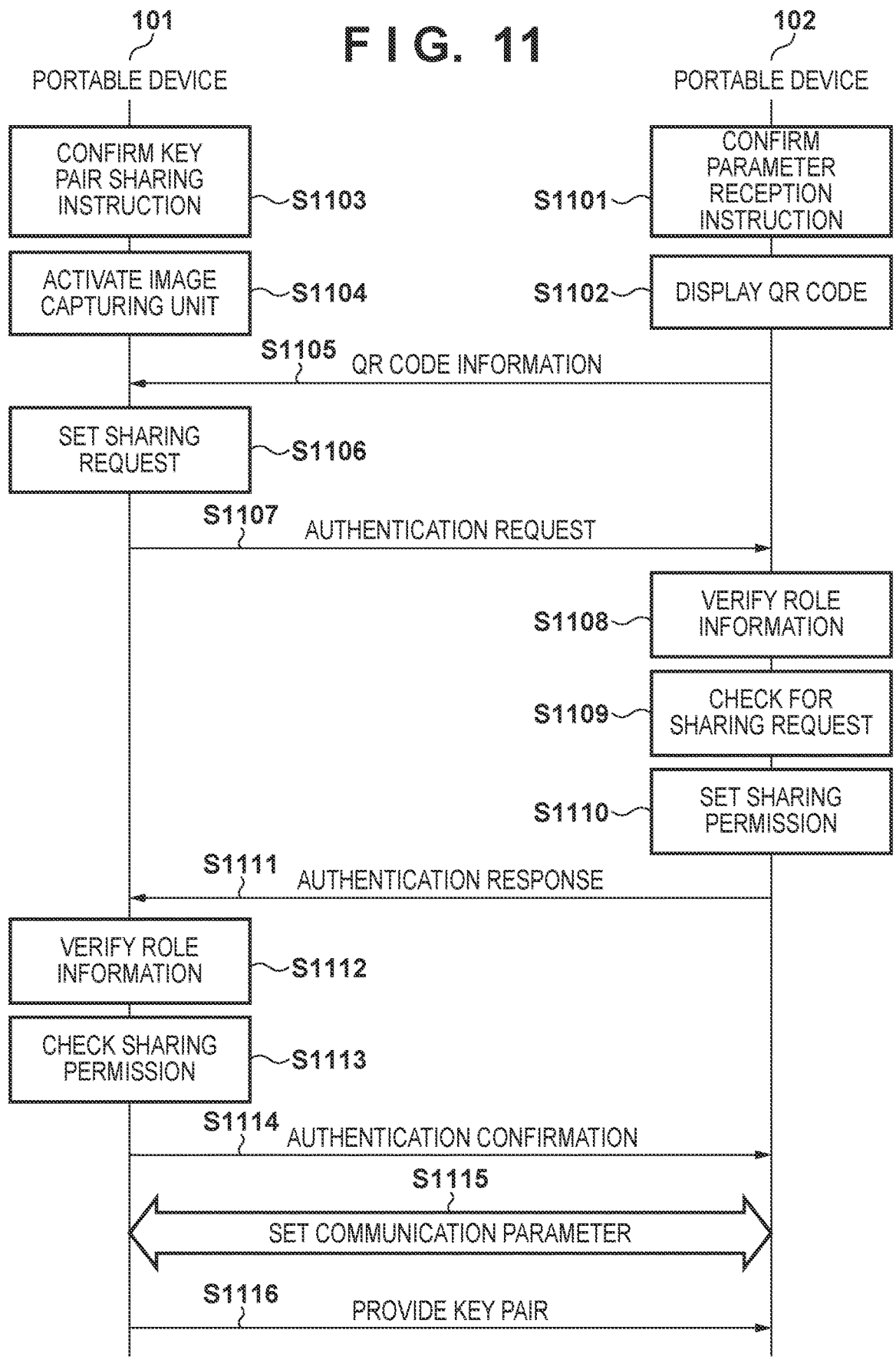
FIG. 11 is a sequence diagram showing key pair sharing processing according to the first embodiment.

FIG. 11 is a sequence diagram showing processing that is performed between the portable device 101 and the portable device 102 according to the second embodiment.

Upon receiving, from the user, an instruction to receive communication parameters (S1101), the portable device 102 displays a QR code on the display (S1102), and waits for an authentication request. On the other hand, in order to enable the portable device 102 to operate as a configurator that provides communication parameters that are used to connect to the wireless network 104, the portable device 101 receives, from the user, an instruction to share a key pair with the portable device 102 (S1103). Upon receiving the instruction in S1103, the portable device 101 activates the image capturing unit 207 to capture an image of the QR code (S1104). The portable device 101 captures an image of the QR code displayed on the display unit 204 of the portable device 102, using the image capturing unit 207, and acquires information that is indicated by the QR code (S1105). Upon acquiring the information indicated by the QR code, the portable device 101 includes information that indicates a key pair sharing request, in an authentication request (S1106), and transmits the authentication request to the portable device 102 (S1107).

Upon receiving the authentication request from the portable device 101 in S1107, the portable device 102 verifies authentication information and role information that are included in the authentication request. Upon succeeding in authentication and confirming that the role information indicates a configurator, the portable device 102 determines whether or not the authentication request includes information that indicates a key pair sharing request (S1109). Upon confirming that information that indicates a key pair sharing request is included therein, the portable device 102 asks the user whether or not to share the key pair, and waits for a sharing permission instruction, which is to be input by the user, using the operation unit 203. Upon receiving an instruction to permit key pair sharing, the portable device 102 includes information that indicates key pair sharing permission, in an authentication request (S1110), and transmits it to the portable device 101 (S1111).

If key pair sharing is not permitted, the key pair providing processing in S1116 described below is not performed. Note that, if key pair sharing is not permitted, it is possible not to transmit an authentication response so as to terminate processing without performing parameter providing processing. Furthermore, if key pair sharing is not permitted, it is possible to transmit a message (an authentication response) that includes information indicating that key pair providing is not permitted, to the portable device 101.

Upon receiving the authentication response, the portable device 101 verifies tag information and role information that are included in the authentication response (S1112). Upon succeeding in authentication using tag information, and confirming that the role information indicates an enrollee, the portable device 101 checks key pair sharing permission that is included in the authentication response (S1113). Upon confirming the presence of the key pair sharing permission, the portable device 101 transmits an authentication confirmation (S1114). Upon authentication being complete in this way, communication parameter providing processing is performed (S1115), and subsequently a key pair providing processing is performed (S1116). The processing performed through S1115 to S1116 is the same as the processing performed through S615 to S616 in FIG. 6.

Figure 12:
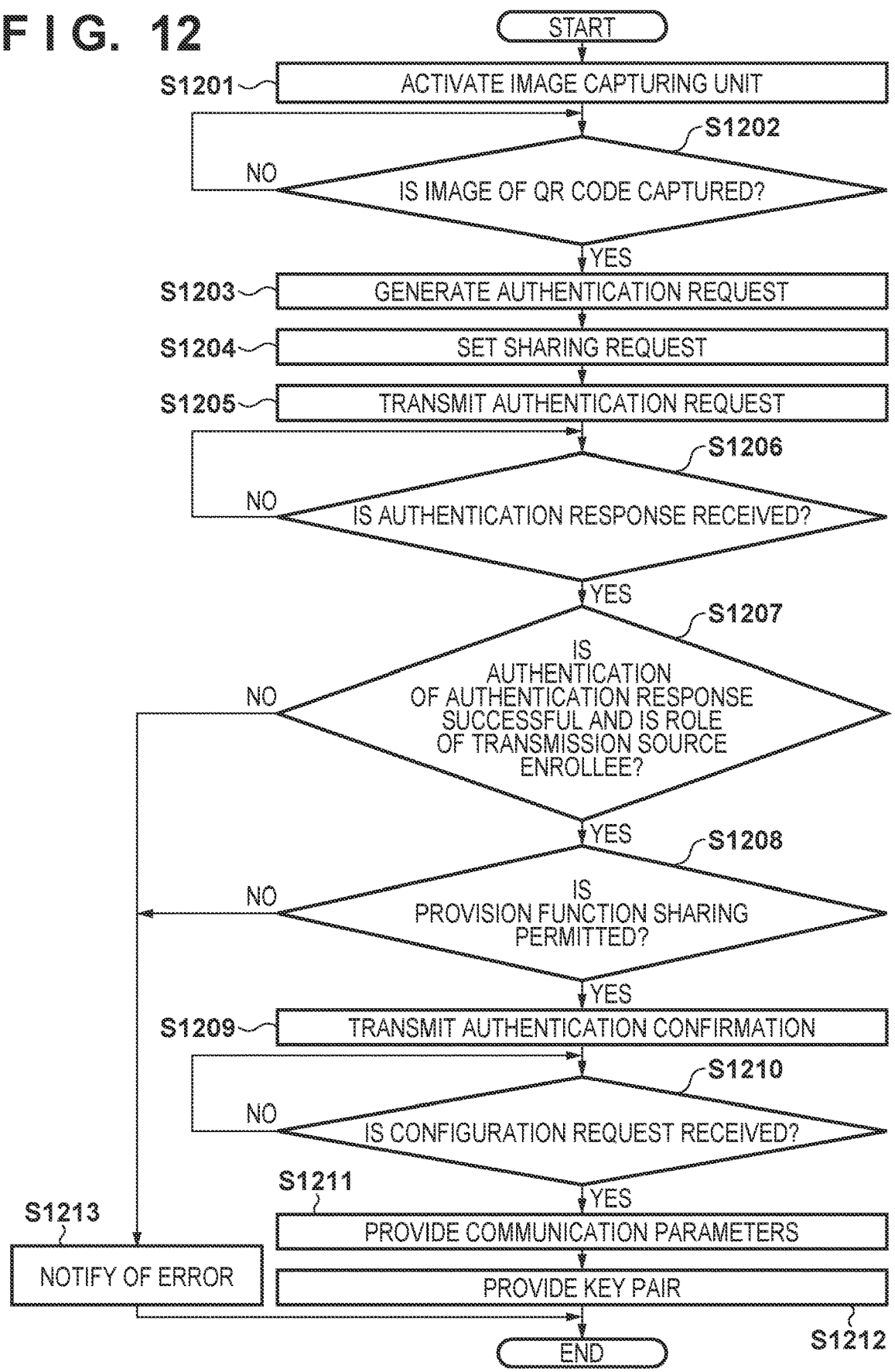
FIG. 12 is a flowchart showing operations performed by the portable device 101 according to a second embodiment.
Figure 13A:
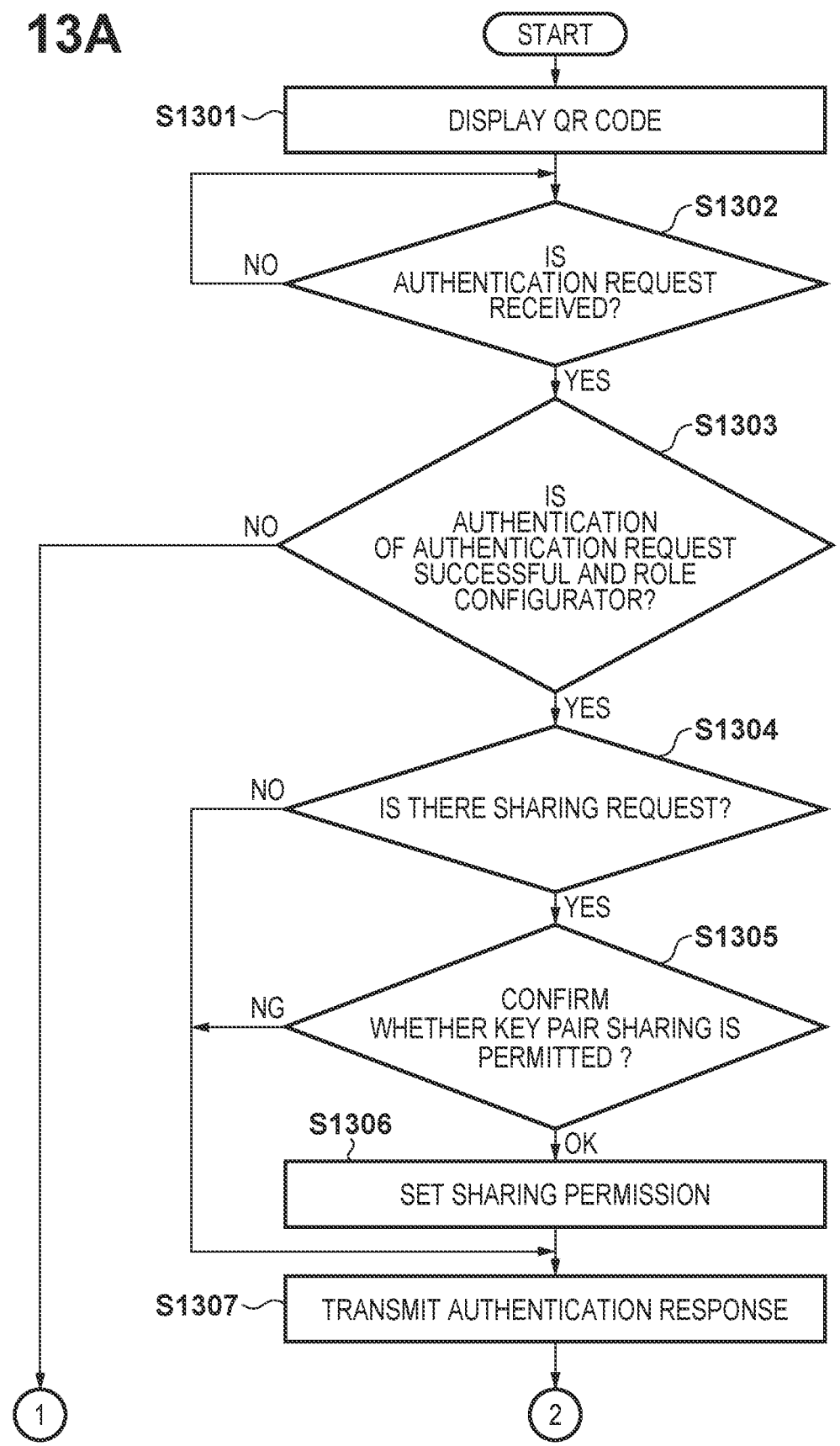
FIG. 13A is a flowchart showing operations performed by the portable device 102 according to the second embodiment.
Figure 13B:
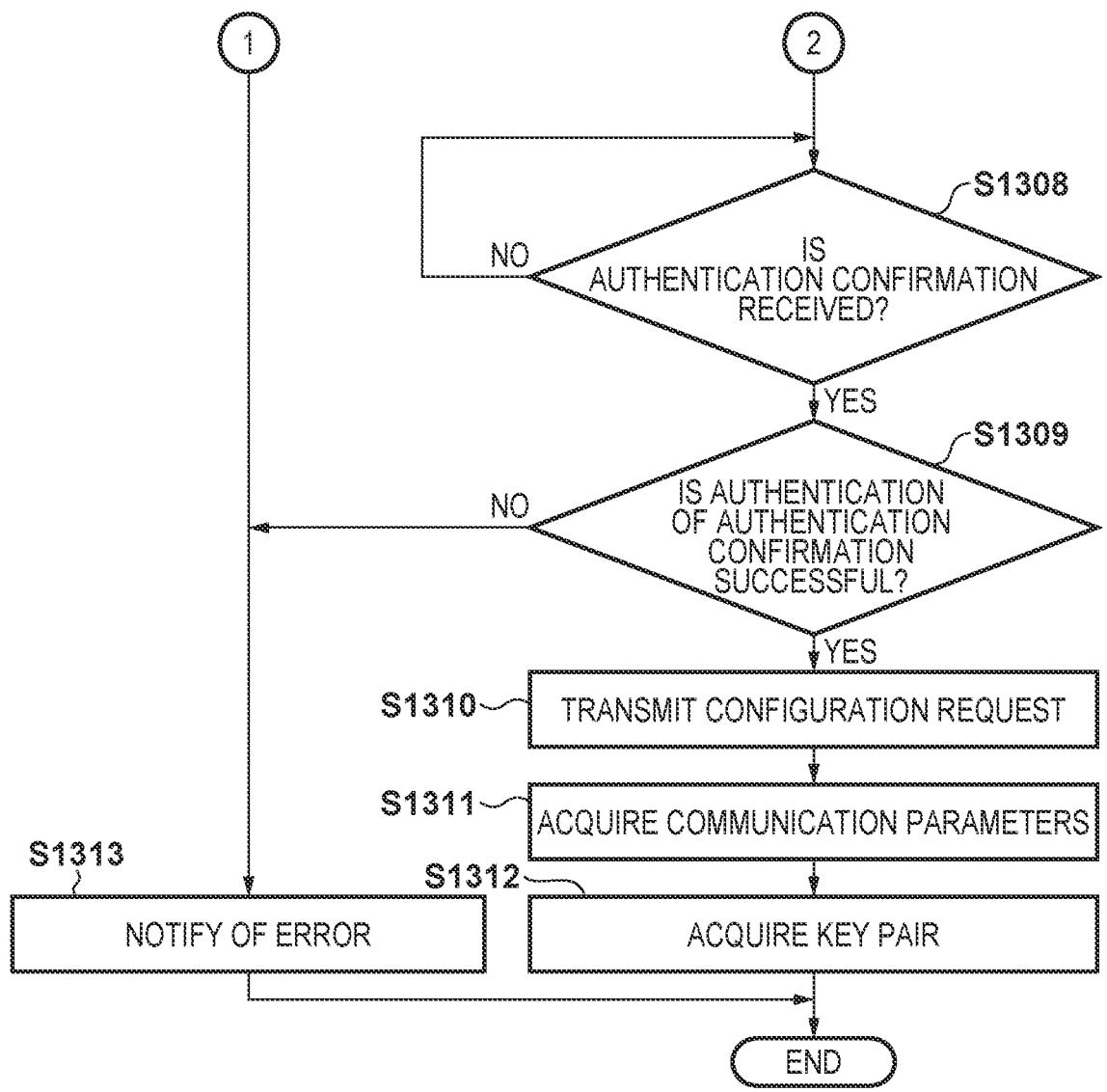
FIG. 13B is a flowchart showing operations performed by the portable device 102 according to the second embodiment.

The following describes operations of the portable device 101 and the portable device 102 that realize the above-described operations with reference to the flowcharts shown in FIGS. 12, 13A, and 13B. FIG. 12 is a flowchart showing processing through which the portable device 101 provides the configurator-specific key pair of the portable device 101 used to perform configuration processing on the access point 103.

Upon receiving, from the user, an instruction to share a key pair with the portable device 102, the key sharing processing unit 212 of the portable device 101 activates the image capturing unit 207 (S1201). Thereafter, the key sharing processing unit 212 determines whether or not the image capturing unit 207 has captured the image of the QR code (S1202). If it is determined in S1202 that an image of the QR code has been captured, the image processing unit 208 decodes the QR code in the captured image to acquire QR code information that includes a public key for authentication of the portable device 102. The control unit 205 generates an authentication request, using the acquired QR code information (S1203). The control unit 205 includes information that indicates a key pair sharing request in the authentication request (S1204), and transmits the authentication request to the portable device 102 (S1205). Thereafter, the key sharing processing unit 212 waits for an authentication response from the portable device 102 (S1206). Note that the key sharing processing unit 212 may terminate key pair sharing processing if the key sharing processing unit 212 cannot receive an authentication response within a predetermined period in S1206.

Upon receiving the authentication response, the control unit 205 determines whether or not authentication of the tag information included in the authentication response has been successful, and whether or not the role information regarding the portable device 102 indicates an enrollee (S1207). If the authentication fails, or if it is determined that the role information does not indicate an enrollee, the control unit 205 displays an error message on the display unit 204 and terminates key pair sharing processing (S1213). Upon determining that the authentication has been successful and the role information indicates an enrollee, the control unit 205 determines whether or not key pair sharing permission is included in the authentication response (S1208). If it is determined that the authentication response does not include key pair sharing permission (NO in S1208), the key sharing processing unit 212 displays an error message on the display unit 204 and terminates key sharing processing (S1213).

If it is determined that the authentication response includes key pair sharing permission (YES in S1208), the control unit 205 transmits an authentication confirmation (S1209), and waits for a configuration request from the portable device 102 (S1210). Upon a configuration request from the portable device 102 being received, the communication parameter processing unit 210 performs communication parameter providing processing to provide communication parameters to the portable device 102 (S1211). Thereafter, the key sharing processing unit 212 provides the key pair (S1212). The processing performed in S1211 and S1212 is the same as the processing performed in S706 and S707.

FIGS. 13A and 13B are flowcharts showing processing through which the portable device 102 receives the configurator-specific key pair provided by the portable device 101. Upon receiving, from the user, an instruction to receive parameters, the code generation unit 209 performs control to generate a QR code and display it on the display unit 204 (S1301). Thereafter, the control unit 205 waits for an authentication request (S1302). Note that the control unit 205 may stop waiting for an authentication request if an authentication request cannot be received within a predetermined period.

Upon receiving an authentication request from the portable device 101, the control unit 205 verifies the authentication information in the authentication request to determine whether or not the authentication is successful (whether or not the device that has transmitted the authentication request is the device that has captured the image of the QR code), and the role determination unit 211 verifies the role information (S1303). If the authentication fails, or the role information indicates a role other than a configurator (NO in S1303), the control unit 205 displays an error message on the display unit 204 (S1313), and terminates processing. Note that display of an error message (S1313) may be omitted.

If the authentication is successful and the role information indicates a configurator (YES in S1303), the control unit 205 determines whether or not a key pair sharing request is set to the authentication request (S1304). If a key pair sharing request is set to the authentication request, the control unit 205 asks the user whether or not to permit the sharing setting (S1305). If the user has permitted the sharing setting (OK in S1305), the control unit 205 sets a sharing permission to an authentication response (S1306), and transmits it to the portable device 101 (S1307). On the other hand, if information that indicates a key pair providing request is not set to the authentication request (NO in S1304), or the user does not permit the sharing setting (NG in S1305), the control unit 205 transmits an authentication response to which a providing permission is not set, to the portable device 101 (S1307). Thereafter, the control unit 205 waits for an authentication confirmation from the portable device 101, to which the authentication response has been transmitted (S1308).

Upon receiving an authentication confirmation from the portable device 101, the control unit 205 performs authentication using tag information that is included in the authentication confirmation. Upon succeeding in the authentication (YES in S1309), the control unit 205 transmits a configuration request to the portable device 101 (S1310). Thereafter, the communication parameter processing unit 210 acquires communication parameters through communication parameter providing processing performed with the portable device 101 (S1311). Also, if a sharing permission has been set in S1306, the key sharing processing unit 212 receives the configurator key pair provided by the portable device 101, and acquires the key pair (S1312).

As described above, according to the second embodiment, it is possible to share the configurator-specific private-public key pair of the portable device 101 used to set the access point 103, based on a key pair sharing request from the portable device 101 to the portable device 102. As a result of sharing the key pair, it is possible to increase the number of configurators that distribute communication parameters that are used to connect to the wireless network 104, which improves user convenience.

Note that even in a case in which the portable device 101 requests that the portable device 102 share the configurator-specific key pair of the portable device 101, the key pair may be shared by providing a key pair sharing request, using a QR code, as in the processing described with reference to FIG. 9 (Modification 1). Also, the key pair may be shared even in a case in which the portable device 101 displays a QR code as in the processing described with reference to FIG. 10 (Modification 2).

Third Embodiment

The first embodiment and the second embodiment describe examples in which a key pair sharing request is provided using a frame or a QR code that are used by the portable device 101 and the portable device 102 to exchange information for authentication. A third embodiment describes processing that is performed in a case in which the portable device 101 requests that the portable device 102 share the configurator-specific key pair of the portable device 101 used to set the access point 103, using a frame for communication parameter configuration processing.

FIG. 14 is a sequence diagram showing processing that is performed between the portable device 101 and the portable device 102 according to the third embodiment.

In order to operate as a configurator that provides communication parameters that are used to connect to the wireless network 104, the portable device 102 receives, from the user, an instruction to share the configurator-specific key pair of the portable device 101 (S1401). Thereafter, the portable device 102 displays the QR code on its own display unit 204, and waits for an authentication request (S1402). The processing performed through S1401 to S1402 is the same as the processing performed through S601 to S602 described with reference to FIG. 6.

On the other hand, the portable device 101, upon receiving, from the user, an instruction to start providing parameters (S1403), captures an image of the QR code displayed by the portable device 102, to acquire QR code information (S1404, S1405). The portable device 101 generates and transmits an authentication request based on the acquired QR code information (S1406).

Upon receiving the authentication request (S1406), the portable device 102 verifies the content of the authentication request. The portable device 102 verifies authentication information that is included in the authentication request. Upon determining that the portable device 101 that has transmitted the authentication request is the device that has captured the image of the QR code (successful authentication), the portable device 102 verifies role information that is included in the authentication request (S1407). Upon determining that the role of the device that has transmitted the authentication request is indicated as being a configurator as a result of verifying the role information, the portable device 102 generates and transmits an authentication response (S1408). Upon transmitting the authentication response to the portable device 101, the portable device 102 waits for an authentication confirmation from the portable device 101. Upon receiving the authentication response (S1408) and succeeding in authentication using tag information, the portable device 101 verifies role information regarding the portable device 102 included in the authentication response (S1409). Upon succeeding in authenticating the authentication response and determining that the role information included in the authentication response indicates an enrollee, the portable device 101 transmits an authentication confirmation to the portable device 102 (S1410). The processing performed through S1403 to S1410 is the same as the processing performed through S403 to S410 described with reference to FIG. 4.

Upon receiving the authentication confirmation (S1410), the portable device 102 verifies the content of the authentication confirmation. As a result of verifying the content of authentication confirmation, upon determining that the authentication is successful, the portable device 102 performs processing to include information that indicates a key pair sharing request, in a configuration request (S1411). A key pair sharing request is expressed by setting a predetermined bit of the DPP Configuration Request frame, for example. Although it is stated here that a predetermined bit is used to express a request for a key pair, the present invention is not limited in this way. For example, role information regarding the role after the reception of communication response, which is to be included in an authentication response, may indicate a role other than an "access point" or "a device that connects to a wireless network". For example, the role information may indicate a "configurator". The portable device 102 transmits the thus generated configuration request that includes a key pair sharing request (S1412). After transmitting the configuration request, the portable device 102 waits for a configuration response from the portable device 101 that has transmitted the authentication confirmation.

Upon receiving the configuration request, the portable device 101 checks whether or not a key pair sharing request is included in the configuration request (S1413). If a key pair sharing request is included in the configuration request, the portable device 101 notifies the user by displaying, on the display unit 204, information that indicates the presence of a key pair sharing request, and waits for an instruction from the user using the operation unit 203 to permit sharing a key pair. Upon being permitted by the user to share a key pair, the portable device 101 includes information that indicates key pair sharing permission, in a configuration response (S1414). Key pair sharing permission is expressed by setting a predetermined bit of the DPP Configuration Response frame, for example. The portable device 101 transmits a configuration response in which information that indicates key pair sharing permission is included, to the portable device 102 (S1415). Upon transmitting the configuration response, the portable device 101 encrypts the configurator-specific private-public key pair of the portable device 101, using the shared key shared between the portable device 101 and the portable device 102, and transmits the encrypted key pair to the portable device 102 (S1416). Note that the configuration response transmitted in S1415 includes the configurator-specific public key of the portable device 101, and therefore only the private key may be transmitted in S1416. Also, in S1415, the portable device 101 may transmit a configuration response that includes the configurator-specific private key of the portable device 101. If this is the case, the processing in S1416 is unnecessary.

In the above description, information that indicates the presence of a key pair sharing request is displayed on the display unit 204, and a key pair is shared on the condition that a permission instruction from the user using the operation unit 203 is received. However, the present invention is not limited in this way. For example, it is possible to provide a key pair without receiving a permission instruction from the user. Also, processing may be performed to include information that indicates key pair sharing permission in the configuration response, without receiving a permission instruction from the user. If this is the case, display of information that indicates the presence of a key pair sharing request may be omitted.

On the other hand, if the user does not permit to share a key pair, key pair providing processing (S1416) is not performed. Alternatively, if key pair sharing is not permitted, it is possible not to transmit a configuration response so as to terminate processing without performing parameter providing processing. Furthermore, if key pair sharing is not permitted, a configuration response that includes information indicating that key pair sharing is not permitted may be transmitted to the portable device 102.

Upon receiving the configuration response, the portable device 102 checks information that indicates key pair sharing permission, included in the configuration response (S1417). If information that indicates key pair sharing permission is not included in the configuration response, the portable device 102 terminates parameter receiving processing. Note that if information that indicates key pair sharing permission is not included in the configuration response, the portable device 102 may notify the user by displaying an error message on the display unit 204.

Figure 16A:
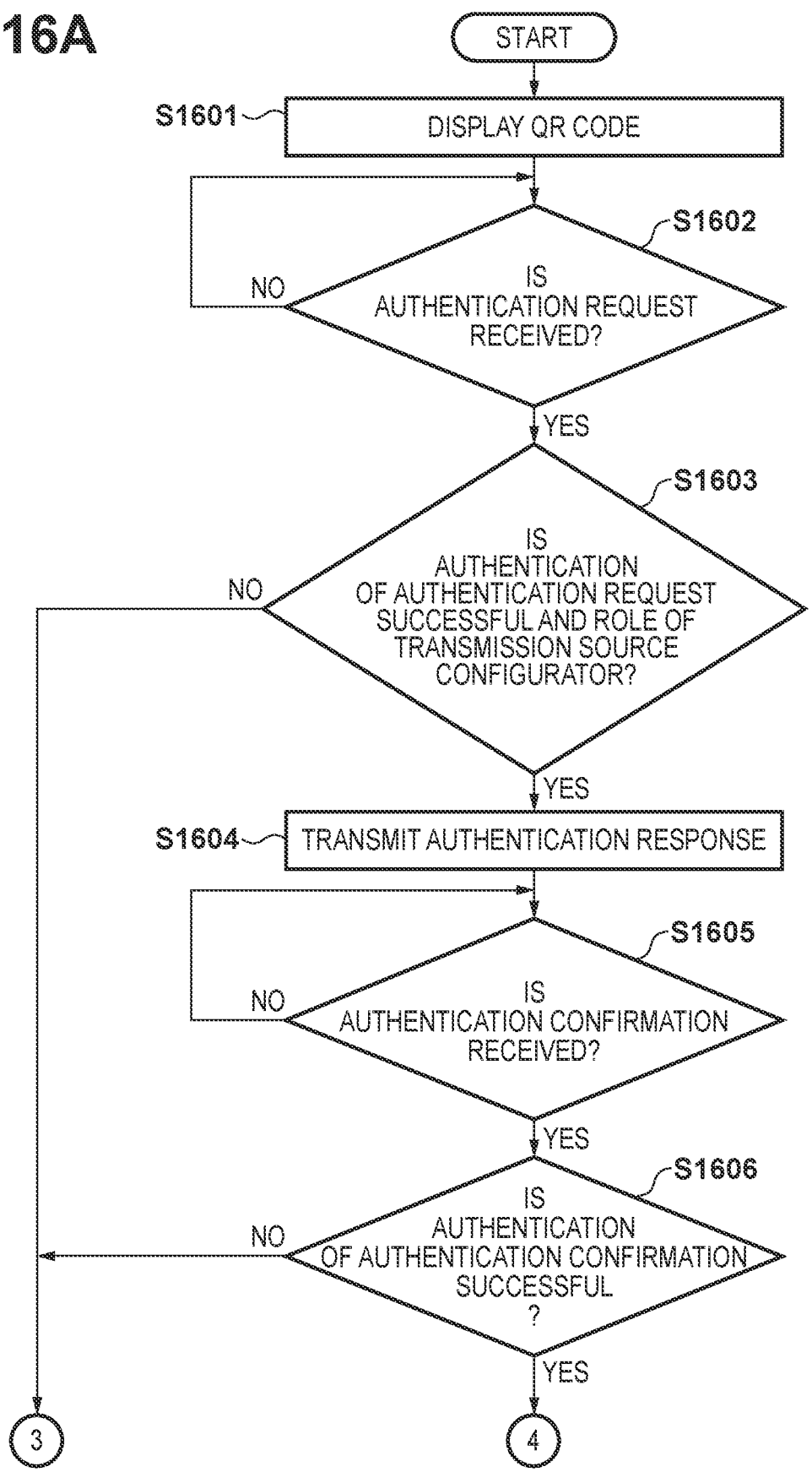
FIG. 16A is a flowchart showing operations performed by the portable device 102 according to the third embodiment.
Figure 16B:
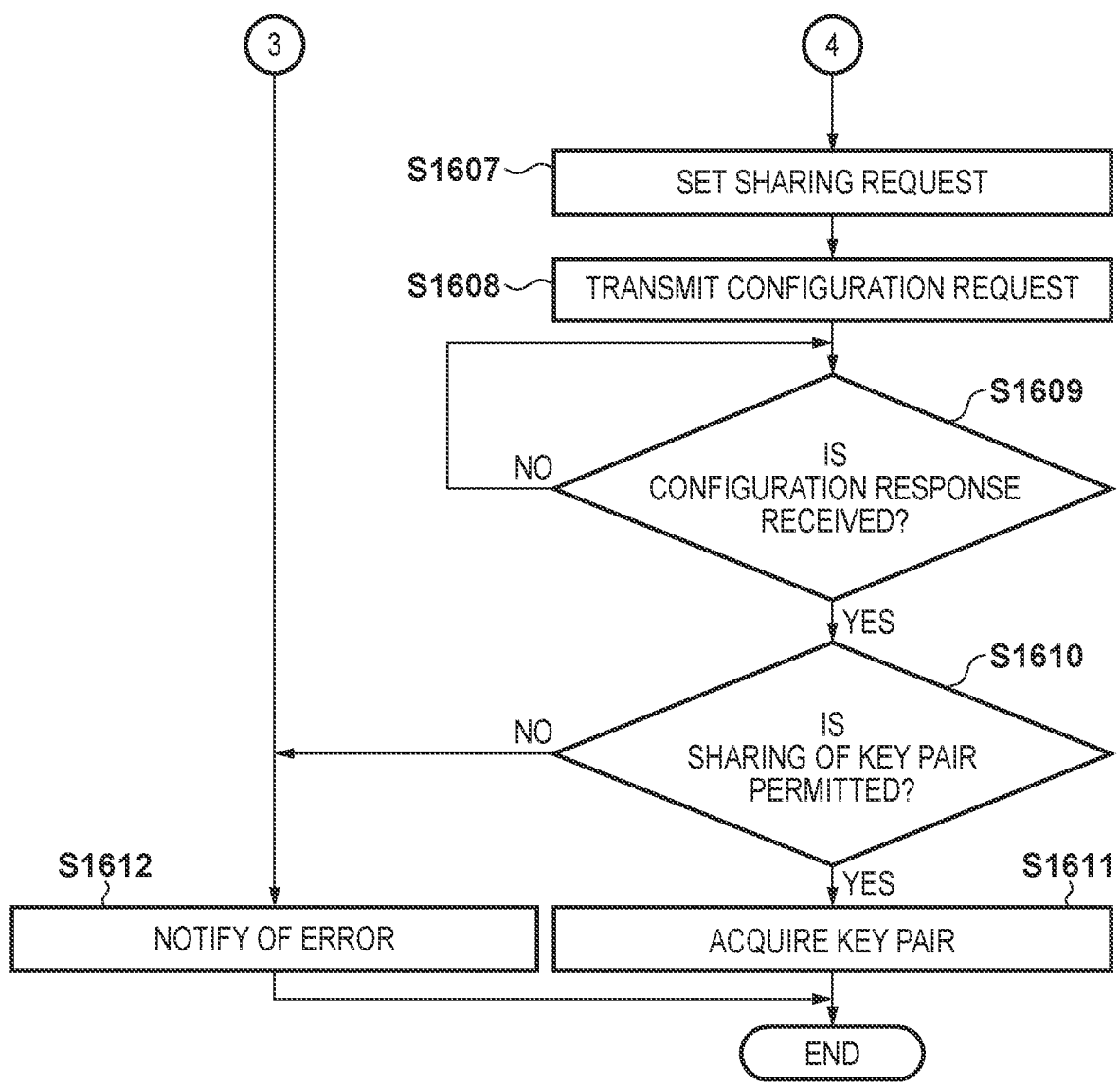
FIG. 16B is a flowchart showing operations performed by the portable device 102 according to the third embodiment.

The following describes processing that is performed by the portable device 101 and the portable device 102 with reference to the flowcharts shown in FIGS. 15, 16A, and 16B.

FIG. 15 is a flowchart showing processing through which the portable device 101 provides a configurator key pair (a private key and a public key) held by the portable device 101 itself, to the portable device 102, in response to a request from the portable device 102. The processing from the step of activating the image capturing unit 207 to the step of receiving the configuration request is the same as the processing shown in FIG. 3 (S301 to S308). FIG. 15 shows processing that is performed after it has been determined that a configuration request has been received, in the processing shown in FIG. 3 (YES in S308).

Upon receiving the configuration request transmitted by the portable device 102, the control unit 205 of the portable device 101 determines whether or not there is a key pair sharing request in the configuration request (S1501). If it has been determined that there is a key pair sharing request, the control unit 205 asks the user whether or not to share a key pair, using the display unit 204 and the operation unit 203 (S1502). If the user has permitted to share the key pair (OK in S1502), the key sharing processing unit 212 sets information that indicates a share permission, to a configuration response (S1503), and transmits it to the portable device 102 (S1504). On the other hand, if it has been determined that there is no key pair sharing request in the configuration request (NO in S1501), or the user does not permit to share a key pair (NG in S1502), the key sharing processing unit 212 skips S1503 and transmits a configuration response without information that indicates a share permission, to the portable device 102 (S1504).

Next, the key sharing processing unit 212 provides a key pair, which consists of the private key and the public key of the configurator, to the portable device 102 (S1505). Note that the key pair is encrypted using the shared key. Also, for the sake of safety, the key pair may be provided in S1505 only when a sharing permission has been set in S1503.

FIGS. 16A and 16B are flowcharts showing processing through which the portable device 102 receives an instruction from the user to share a key pair that is held by the portable device 101, and acquires the configurator-specific key pair of the portable device 101, which has been used in the configuration processing for the access point 103.

Upon receiving an instruction to share a key pair, from the user, via the operation unit 203, the control unit 205 of the portable device 102 generates a QR code and displays it on the display unit 204 (S1601). Thereafter, the control unit 205 waits for an authentication request (S1602). Upon receiving an authentication request from the portable device 101, the control unit 205 performs authentication and verifies role information to determine whether or not the role that is indicated by the role information is a configurator (S1603). If it has been determined that the authentication has failed or the role of the portable device 101 is not a configurator (NO in S1603), the control unit 205 displays an error message on the display unit 204 (S1612), and terminates processing.

On the other hand, if it has been determined that authentication is successful in S1603, and it has been determined that the role of the portable device 101 that has transmitted the authentication request is a configurator (YES in S1603), the control unit 205 transmits an authentication response (S1604), and waits for an authentication confirmation from the portable device 101. Upon receiving an authentication confirmation from the portable device 101 (YES in S1605), the control unit 205 determines whether or not authentication performed using tag information that is included in the authentication confirmation has been successful (S1606).

Upon receiving an authentication confirmation from the portable device 101, the control unit 205 performs authentication using tag information that is included in the authentication confirmation. Upon succeeding in the authentication (YES in S1606), the key sharing processing unit 212 sets information that indicates a key pair sharing request, to the configuration request (S1607). Thereafter, the control unit 205 transmits a configuration request to which a sharing request is set, to the portable device 101 (S1608), and waits for configuration response from the portable device 101. On the other hand, if it has been determined in S1606 that verification of the tag information has failed, the control unit 205 displays an error message on the display unit 204, and terminates processing (S1612).

Upon receiving a configuration response from the portable device 101 (S1609), the control unit 205 determines whether or not information that indicates key pair sharing permission is included in the configuration response (S1610). If it is determined that information that indicates key pair sharing permission is included in the configuration response (YES in S1610), the key sharing processing unit 212 acquires the configurator-specific key pair of the portable device 101 (S1611). If it is determined in S1610 that information that indicates key pair sharing permission is not included in the configuration response (NO in S1610), the control unit 205 terminates parameter receiving processing or displays an error message on the display unit 204, and terminates processing (S1612).

OTHER EMBODIMENTS

Each of the embodiments above describes a configuration in which an image of a QR code (registered trademark) is used to exchange information for communication parameter setting, between devices. However, instead of capturing an image of a QR code (registered trademark), it is possible to employ wireless communication such as NFC or Bluetooth (registered trademark), for example. Alternatively, it is possible to employ wireless communication such as IEEE802.11ad or TransferJet (registered trademark), for example.

Note that a QR code (registered trademark) that is to be read is not limited to a QR code that is displayed on the display unit, and may be a QR code that is attached to the housing of a communication device in the form of a sticker or the like. Also, a QR code (registered trademark) that is to be read may be attached to an instruction manual or packaging such as a cardboard container in which the communication device is sold, for example. A barcode, or two-dimensional code may also be used instead of a QR code. Also, user-readable information may be used instead of machine-readable information such as a QR code.

Each of the embodiments above describes a case in which wireless LAN communication conforming to IEEE 802.11 is performed between devices. However, the present invention is not limited in this way. For example, wireless communication may be performed using a wireless communication medium such as wireless USB, MBOA, Bluetooth (registered trademark), UWB, ZigBee, or NFC. Here, MBOA is an abbreviation of Multi Band OFDM Alliance. UWB includes wireless USB, wireless 1394, WINET, and so on.

Each of the embodiments above describes a case in which communication parameters that are used to connect to an access point of a wireless LAN are provided. However, the present invention is not limited in this way. For example, communication parameters that are used to connect to a group owner of Wi-Fi Direct (registered trademark) may be provided.

As described above, according to each of the embodiments, it is possible to share a private-public key pair that is used by a configurator to encrypt and decrypt communication parameters, in response to a request from another device, or a request from the configurator. As a result, it is easier to increase the number of configurators that provide communication parameters that are used to connect to an access point. For example, during a communication parameter setting procedure according to the DPP, it is possible to share the key pair of a configurator between the configurator and an enrollee without using a recording medium or another protocol (such as HTTP).

According to the above-described embodiments, it is possible to simplify the troublesome steps that are to be taken to provide unique information that has been used to set communication parameters, to another device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
at least one memory; and
at least one processor in communication with the at least one memory,
wherein the at least one processor of the communication device is configured to perform:
performing authentication processing defined in Device Provisioning Protocol by communicating information for authentication with an external device; and
providing second information including a private key, in response to receipt of a frame containing first information indicating role of a configurator defined in Device Provisioning Protocol from the external device, wherein the private key is a key to be used when the external device functions as the configurator defined in Device Provisioning Protocol and is used when the external device generates a shared key for data encryption and decryption, the second information being provided to the external device after the authentication processing is successful;

wherein the external device functions as the configurator based on the provided second information.

2. The communication device according to claim 1, wherein the received frame containing the first information indicating role of the configurator is a frame received in a case where authentication by the authentication processing is successful.

3. The communication device according to claim 2, wherein the authentication processing includes transmitting an authentication request and receiving an authentication response.

4. The communication device according to claim 3, wherein the authentication request is DPP Authentication Request, and the authentication response is DPP Authentication Response.

5. The communication device according to claim 1, wherein the frame is a DPP Configuration Request frame.

6. The communication device according to claim 1, wherein the one or more processors further cause the communication device to inquire of a user as to whether or not to permit provision of information used for encryption in a case where the first information is included in the frame.

7. The communication device according to claim 1, wherein the generated shared key is used to encrypt a communication parameter in providing the communication parameter.

8. The communication device according to claim 1, wherein the one or more processors further cause the communication device to, in a case where the frame contains third information indicating role of an access point, transmit a communication parameter to the external device.

9. A communication device comprising:
at least one memory; and
at least one processor in communication with the at least one memory,
wherein the at least one processor of the communication device is configured to perform:
communicating information for authentication processing defined in Device Provisioning Protocol with an external device;
transmitting a frame containing information indicating role of a configurator defined in Device Provisioning Protocol to the external device after the authentication processing is successful;
receiving second information including a private key, wherein the private key is a key to be used when the communication device functions as the configurator defined in Device Provisioning Protocol and which is used when the communication device generates a shared key for data encryption and decryption, the second information being received from the external device that received the frame; and
functioning as the configurator based on the received second information.

10. The communication device according to claim 9, wherein the transmitted frame containing information indicating role of the configurator is a frame transmitted in a case where authentication by the authentication processing is successful.

11. The communication device according to claim 10, wherein the authentication processing includes receiving an authentication request and transmitting an authentication response.

12. The communication device according to claim 11, wherein the authentication request is DPP Authentication Request, and the authentication response is DPP Authentication Response.

13. The communication device according to claim 9, wherein the frame is a DPP Configuration Request frame, wherein the communication device functioning as an enrollee defined in the Device Provisioning Protocol.

14. The communication device according to claim 9, wherein the second information is information for providing communication parameters.

15. The communication device according to claim 9, wherein the generated shared key is used to encrypt a communication parameter in providing the communication parameter.

16. A control method of a communication device comprising:
performing authentication processing defined in Device Provisioning Protocol by communicating information for authentication with an external device; and
providing second information including a private key, in response to receipt of a frame containing first information indicating role of a configurator defined in Device Provisioning Protocol from the external device, wherein the private key is a key to be used when the external device functions as the configurator defined in Device Provisioning Protocol and is used when the external device generates a shared key for data encryption and decryption, the second information being provided to the external device after the authentication processing is successful;
wherein the external device functions as the configurator based on the provided second information.

17. A non-transitory computer-readable storage medium storing a program for causing a computer to execute a control method according to claim 16.

18. A control method of a communication device comprising:
communicating information for authentication processing defined in Device Provisioning Protocol with an external device;
transmitting a frame containing information indicating role of a configurator defined in Device Provisioning Protocol to the external device after the authentication processing is successful;
receiving second information including a private key, wherein the private key is a key to be used when the communication device functions as the configurator defined in Device Provisioning Protocol and which is used when the communication device generates a shared key for data encryption and decryption, the second information being received from the external device that received the frame; and
functioning as the configurator based on the received second information.

19. A non-transitory computer-readable storage medium storing a program for causing a computer to execute a control method according to claim 18.

* * * * *